US012793741B2

(12) United States Patent
Zhu et al.

(10) Patent No.: US 12,793,741 B2
(45) Date of Patent: Nov. 10, 2026

(54) METHOD, APPARATUS, MEDIUM AND DEVICE FOR PUSHING VIDEO TEMPLATE

(71) Applicant: Beijing Zitiao Network Technology Co., Ltd., Beijing (CN)

(72) Inventors: Hangcheng Zhu, Beijing (CN); Jie Li, Beijing (CN); Rong Zeng, Beijing (CN); Yuting Liang, Beijing (CN); Yan Shao, Beijing (CN); Guojun Ma, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/877,910

(22) PCT Filed: Dec. 5, 2023

(86) PCT No.: PCT/CN2023/136606

§ 371 (c)(1),
(2) Date: Dec. 20, 2024

(87) PCT Pub. No.: WO2024/120407

PCT Pub. Date: Jun. 13, 2024

(65) Prior Publication Data

US 2025/0372126 A1 Dec. 4, 2025

(30) Foreign Application Priority Data

Dec. 9, 2022 (CN) ......................... 202211585917.3

(51) Int. Cl.
*G11B 27/036* (2006.01)
*G06F 40/30* (2020.01)

(52) U.S. Cl.
CPC ............ *G11B 27/036* (2013.01); *G06F 40/30* (2020.01)

(58) Field of Classification Search
CPC ... G11B 27/036; G06F 16/735; G06F 16/739; G06F 16/78; G06F 16/783; G06F 40/30;
(Continued)

(56) References Cited

U.S. PATENT DOCUMENTS

2018/0330756 A1* 11/2018 MacDonald .......... G06F 16/951
2020/0218517 A1 7/2020 Lee
2022/0108726 A1 4/2022 Li et al.

FOREIGN PATENT DOCUMENTS

CN 109033266 A 12/2018
CN 111105819 A 5/2020
(Continued)

OTHER PUBLICATIONS

International Patent Application No. PCT/CN2023/136606; Int'l Search Report; dated Mar. 6, 2024; 3 pages.
(Continued)

*Primary Examiner* — Thai Q Tran
*Assistant Examiner* — Nienru Yang
(74) *Attorney, Agent, or Firm* — BakerHostetler

(57) ABSTRACT

The present disclosure relates to a method, apparatus, apparatus, and medium for pushing a video template. First heat of a candidate video editing template represents creation heat of the candidate video editing template at a video creation end, and second heat represents viewing heat of a target video, that is created by using the candidate video editing template, at a video publishing end. Heat of the candidate video editing template may be determined based on heat in an entire link between the video creation end and the video publishing end. Moreover, a target video editing template is more accurately determined, and the target video editing template is presented to the client for users to use to create and publish a video.

20 Claims, 6 Drawing Sheets

(58) Field of Classification Search
CPC .... G06V 10/74; G06V 10/761; H04N 21/234; H04N 21/23412; H04N 21/25; H04N 21/251; H04N 21/84
USPC .......................................................... 386/278
See application file for complete search history.

(56) References Cited

FOREIGN PATENT DOCUMENTS

| | | | | | |
|---|---|---|---|---|---|
| CN | 113094552 | A | | 7/2021 | |
| CN | 113111222 | A | * | 7/2021 | ......... G06F 16/7867 |
| CN | 113127576 | A | | 7/2021 | |
| CN | 111105819 | B | * | 8/2021 | ........... G11B 27/031 |
| CN | 113660526 | A | | 11/2021 | |
| CN | 114970562 | A | * | 8/2022 | ........... G06F 40/242 |
| CN | 115269889 | A | | 11/2022 | |
| WO | WO 2022/007520 | A1 | | 1/2022 | |

OTHER PUBLICATIONS

Japan Patent Application No. 2025-519126; Notice of Reasons for Refusal; dated Mar. 3, 2026; 6 pages.

* cited by examiner

METHOD, APPARATUS, MEDIUM AND DEVICE FOR PUSHING VIDEO TEMPLATE

This disclosure is a national phase filing of International Patent Application No. PCT/CN2023/136606 filed Dec. 5, 2023, which claims priority to Chinese patent application No. 202211585917.3, filed on Dec. 9, 2022, entitled “METHOD, APPARATUS, MEDIUM AND DEVICE FOR PUSHING VIDEO TEMPLATE”, the disclosures of which are incorporated herein by reference in their entireties.

FIELD

The present disclosure relates to the field of internet, and more particularly to a method, apparatus, medium and device for pushing a video template.

BACKGROUND

For most traditional internet content ecosystems, pushing a video template is implemented at a video publishing end (such as, a short video application program). However, with the emergence of video editing applications, the creation-oriented content ecosystem is gradually emerging. Users may use video editing templates at the video creation end (such as, a video editing application) in the creation-oriented content scenario to create videos and publish the created videos. This renders the process for pushing video editing templates in the creation-oriented content ecosystem scenario particularly important. Therefore, it is an urgent technical problem to provide a scheme for pushing a video editing template that is suitable for creation-oriented content ecosystem scenarios and has high reliability.

SUMMARY

In order to solve the above technical problems or at least partially solve the above technical problems, the present disclosure provides a method, apparatus, medium and device for pushing a video template.

Embodiments of the present disclosure provide a method for pushing a video template, the method is applied to the client and the method includes:

obtaining and presenting a candidate template description information set, wherein the candidate template description information set includes at least one piece of candidate template description information; the candidate template description information is configured to describe a common feature of at least one candidate video editing template, and the candidate template description information is screened into the candidate template description information set based on heat of the at least one candidate video editing template; wherein the candidate video editing template includes instruction information for a video editing operation, the candidate video editing template is configured to instruct to edit initial image material according to the video editing operation to obtain a target video, wherein the heat of the candidate video editing template includes first heat and second heat, the first heat is configured to represent a preference level of a video creation user for the candidate video editing template, and the second heat is configured to represent a preference level of a video viewing user for the target video; and in response to a user operation for selecting target template description information from the candidate template description information set, obtaining a target video editing template that matches the target template description information and presenting the target video editing template.

Embodiments of the present disclosure provide a method for pushing a video template, the method is applied to a server and the method includes:

obtaining heat of at least one candidate video editing template, wherein the candidate video editing template includes instruction information for a video editing operation, the candidate video editing template is configured to instruct to edit initial image material according to the video editing operation to obtain a target video, wherein the heat of the candidate video editing template includes first heat and second heat, the first heat is configured to represent a preference level of a video creation user for the candidate video editing template, and the second heat is configured to represent a preference level of a video viewing user for the target video;

generating a candidate template description information set based on the heat of the at least one candidate video editing template, wherein the candidate template description information set includes at least one piece of candidate template description information, the candidate template description information is configured to describe a common feature of the at least one candidate video editing template, and pushing the candidate template description information set to a client to present the candidate template description information set; and receiving target template description information selected from the candidate template description information set and sent by the client, obtaining a target video editing template that matches the target template description information, and pushing the target video editing template to the client to present the target video editing template.

Embodiments of the present disclosure further provide an apparatus for pushing a video template, the apparatus is configured at a client and the apparatus includes:

a first obtaining module configured to obtain and present a candidate template description information set, wherein the candidate template description information set includes at least one piece of candidate template description information; the candidate template description information is configured to describe a common feature of at least one candidate video editing template, and the candidate template description information is screened into the candidate template description information set based on heat of the at least one candidate video editing template; wherein the candidate video editing template includes instruction information for a video editing operation, the candidate video editing template is configured to instruct to edit initial image material according to the video editing operation to obtain a target video, wherein the heat of the candidate video editing template includes first heat and second heat, the first heat is configured to represent a preference level of a video creation user for the candidate video editing template, and the second heat is configured to represent a preference level of a video viewing user for the target video; and a second obtaining module configured to obtain, in response to a user operation for selecting target template description information from the candidate template description information set, a target video editing template that matches the target template description information, and present the target video editing template.

Embodiments of the present disclosure further provide an apparatus for pushing a video template, the apparatus is configured at a sever and the apparatus includes:

a third obtaining module configured to obtain heat of at least one candidate video editing template, wherein the candidate video editing template includes instruction information for a video editing operation, the candidate video editing template is configured to instruct to edit initial image material according to the video editing operation to obtain a target video, wherein the heat of the candidate video editing template includes first heat and second heat, the first heat is configured to represent a preference level of a video creation user for the candidate video editing template, and the second heat is configured to represent a preference level of a video viewing user for the target video;

a generation module configured to generate a candidate template description information set based on the heat of the at least one candidate video editing template, wherein the candidate template description information set includes at least one piece of candidate template description information, the candidate template description information is configured to describe a common feature of the at least one candidate video editing template, and push the candidate template description information set to a client to present the candidate template description information set; and a fourth obtaining module configured to receive target template description information selected from the candidate template description information set and sent by the client, obtain a target video editing template that matches the target template description information, and push the target video editing template to the client to present the target video editing template.

Embodiments of the present disclosure also provide a computer-readable storage medium, where the storage medium stores a computer program, and the computer program is configured for performing the method as provided in the first aspect or the second aspect of the embodiments of the present disclosure.

Embodiments of the present disclosure also provide a device, the device includes a processor; a memory for storing processor-executable instructions; the processor is configured for reading executable instructions from the memory, and executing the instructions to implement the method as provided in the first aspect or the second aspect of the embodiments of the present disclosure.

Embodiments of the present disclosure also provide a computer program product, the computer program product includes a computer program or instructions, the computer program or instructions, when executed by a processor, implement the method as provided in the first aspect or the second aspect of the embodiments of the present disclosure.

The technical solution provided by the embodiments of the present disclosure has the following advantages compared with the prior art: the embodiments of the present disclosure provide a method, apparatus, medium and device for pushing a video template, the method including: obtaining and presenting a candidate template description information set, where, the candidate template description information set includes at least one piece of candidate template description information; the candidate template description information is configured to describe a common feature of at least one candidate video editing template, and the candidate template description information is screened into the candidate template description information set based on heat of the at least one candidate video editing template; where the candidate video editing template includes instruction information for a video editing operation, the candidate video editing template is configured to instruct to edit initial image material according to the video editing operation to obtain a target video, where the heat of the candidate video editing template includes first heat and second heat, the first heat is configured to represent a preference level of a video creation user for the candidate video editing template, and the second heat is configured to represent a preference level of a video viewing user for the target video; and in response to a user operation for selecting target template description information from the candidate template description information set, obtaining a target video editing template that matches the target template description information and presenting the target video editing template. By adopting the above technical solution, the first heat may characterize creation heat of the candidate video editing template at the video creation end, and the second heat can characterize viewing heat of the target video, that is created by using the candidate video editing template, at the video publishing end. In this way, the heat of the candidate video editing template can be determined based on the heat in the entire link including the video creation end and the video publishing end, thereby expanding consideration factors for the heat of the candidate video editing template. Therefore, the heat of the candidate video editing template can be calculated more accurately, which further improves the accuracy of the candidate template description information set obtained based on the heat screening. Finally, the target video editing template can be more accurately determined based on the candidate template description information set, and the target video editing template can be presented at the video creation end for users to use for video creation and publishing. Therefore, this method can be applied to a mode for pushing a video template in a creation-oriented content ecological scenario, and the reliability of the mode for pushing a video template is ensured at the same time.

BRIEF DESCRIPTION OF THE DRAWINGS

In conjunction with the accompanying drawings and with reference to the following detailed description, the above and other features, advantages and aspects of the various embodiments of the present disclosure will become more apparent. Throughout the drawings, the same or similar reference numerals denote the same or similar elements. It should be understood that the drawings are illustrative and that the components and elements are not necessarily drawn to scale.

DETAILED DESCRIPTION

Figure 1:
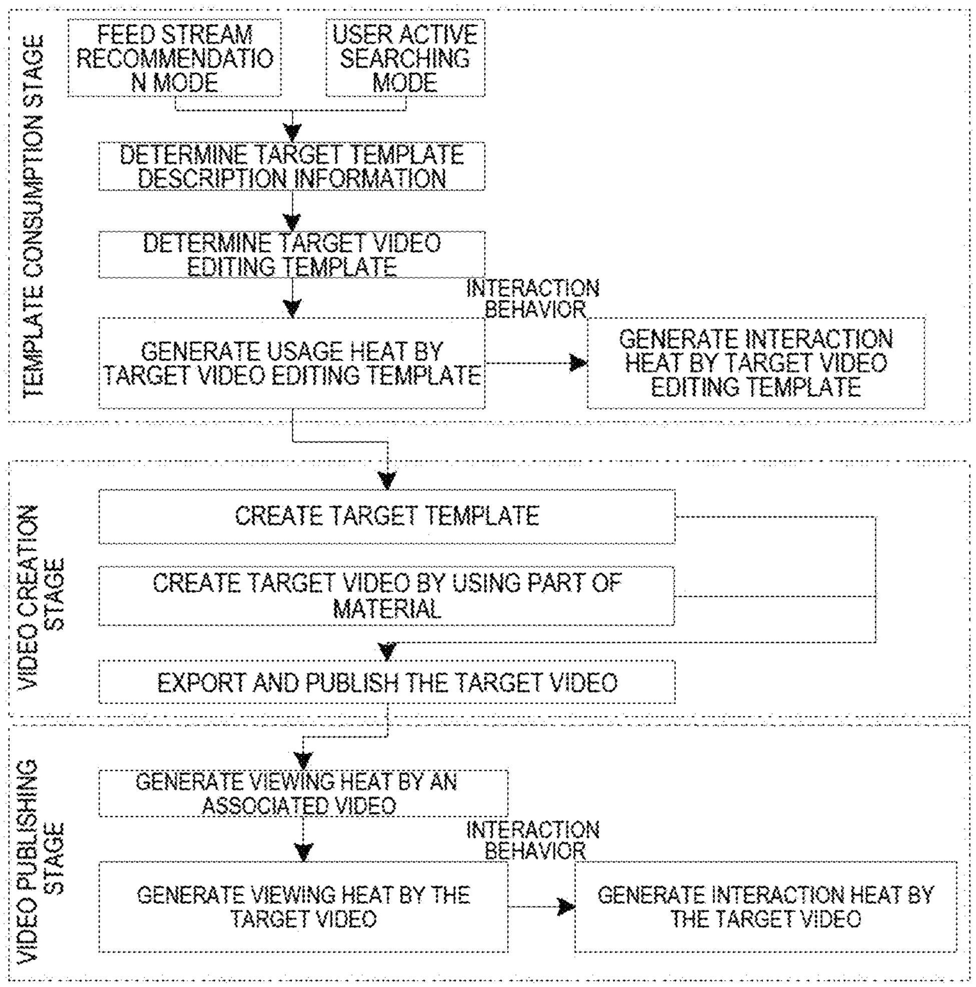
FIG. 1 is a link schematic diagram for mining a video template provided by an embodiment of the present disclosure.

The following will describe the embodiments of the present disclosure in more detail with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are provided for illustrative purposes only and are not intended to limit the scope of protection of the present disclosure.

It should be understood that the various steps described in the method implementation of this disclosure can be executed in different orders and/or in parallel. In addition, the method implementation can include additional steps and/or the steps as shown may be omitted. The scope of this disclosure is not limited in this regard.

The term "including" and its variations as used herein are non-exclusive inclusion, i.e. "including but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It should be noted that the concepts of "first" and "second" mentioned in this disclosure are only used to distinguish different apparatuses, modules, or units, but are not used to limit the order or interdependence of the functions performed by these apparatuses, modules, or units.

It should be noted that the modifications of "one" and "a plurality of" mentioned in this disclosure are illustrative but not limiting. Those skilled in the art should understand that unless otherwise indicated in the context, they should be understood as "one or more".

The names of the messages or information interacted between a plurality of apparatuses in this public implementation are for illustrative purposes only, which are not intended to limit the scope of these messages or information.

With the gradual emerging of video editing applications, the internet content ecosystem has gradually shifted from a consumption-oriented content ecosystem to a creation-oriented content ecosystem. In other words, the method for creating videos has gradually shifted from the video publishing end (such as short video applications) to the video creation end (such as video editing applications), and users use video editing templates at the video creation end to create videos and publish the created videos, to achieve video creation and publishing in creation-oriented content ecology scenarios. Among them, the video publishing end and the video publishing end can be located at the same client or at different clients.

Generally, the video editing templates used by users at the video creation end are template videos pushed by the video creation end, making the process for pushing video editing templates at the video creation end particularly important. However, in the creation-oriented content ecosystem scenarios, the process for pushing video editing templates has encountered new problems and challenges, including:

(1) Compared to the consumer-oriented content ecosystem, the creation form has changed, resulting in richer and multi-level content ecology such as video templates and creation material (such as copywriting, props, special effects, music, etc.), making the process for pushing a video editing template more complex.

(2) In addition to using video editing templates at the video creation end, target videos created based on the video editing templates and creation material will also be published at the video publishing end in consumption-oriented content ecosystem scenarios (such as short video applications, websites, chat software, etc.) for video viewing users to view. This also requires consideration of heat of the target video generated at the video publishing end, making the link of mining hotspot longer.

(3) Based on the above two reasons, the dimensions for characterizing heat in creation-oriented content ecosystem scenarios are more hierarchical and diverse, making it difficult to directly rank the heat through a single metric. For example, the relevant consumption index of video editing templates involves the number of creations created using video editing templates, the number of viewings, likes, forwards, and comments of the target video created based on the video editing template in the consumption-oriented content ecosystem scenario, as well as the number of viewings of an associated video corresponding to the target video. It is necessary to calculate the heat of template more accurately based on these indexes, which increases the complexity of calculating the heat of video editing templates.

(4) Compared with the consumption-oriented content ecosystem scenario, the homogenization of video editing templates is stronger in the creation-oriented content ecosystem scenario, and the definition of homogeneous content is different from that in the consumption-oriented content ecosystem scenario. For example, although the material used in the two video editing templates is different, as long as there are many similarities in the music, segment number, transition, gameplay, and special effects used, they will still be defined as homogeneous video editing templates. Therefore, a method for processing homogeneous templates suitable for the creation-oriented content ecosystem scenario is needed.

In summary, facing the above problems and challenges, it is urgent to provide a method for pushing a video editing template that is suitable for the creation-oriented content ecosystem scenario and has high reliability.

In order to facilitate understanding of the video creation end and the video publishing end of this entire link, FIG. 1 shows a link schematic diagram for mining a video template provided by an embodiment of the present disclosure.

As shown in FIG. 1, the entire link involved in mining a video template includes three stages: a template consumption stage, a video creation stage, and a video publishing stage. Specifically, the client may mine a candidate template description information set based on the hotspot of each video template involved in the process for creating a target video, so as to further mine a video template based on the candidate template description information set. Among them, published users refer to video creation reference users, and created videos refer to target reference videos.

In the template consumption stage, in some cases, the server pushes a candidate template description information set to a client through Feed recommendation mode or user active searching mode, so that the client obtains and presents the candidate template description information set. Then, based on the user operation of the video creation user, the client selects a target template description information from the candidate template description information set and obtains a target video editing template that matches the target template description information. In other cases, the client may also determine a matching target template description information based on active searching and obtain the target video editing template that matches the target template description information. Regardless of which method is used, after determining the target video editing template, the client may generate heat for the target video editing template, such as generating usage heat for the target video editing template, and generating interaction heat for the target video editing template such as likes, comments, forwards, collections, etc.

In the video creation stage, in some cases, the client creates a target video editing template in response to an editing operation sent by the video creation user, generates a secondary creation video exclusive to the video creation user, and uses the secondary creation video as the target video. In other cases, instead of relying on the target video editing template determined during the template consumption stage, the client directly generates the target video based on at least part of material in response to an editing operation sent by the video creation user for at least some material (such as music, stickers, special effects, gameplay, filters, etc.). Through the above creation method, the client will generate usage heat for using at least some material.

In the video publishing stage, the target video generated in the video creation stage can be published in the client. Specifically, the client can publish the target video from the video creation end to the video publishing end, so that the target video can be published at the video publishing end for non-video creation users to view. It can be understood that after publishing the target video editing template, the client can generate viewing heat of an associated video including part of material in the target video editing template, viewing heat for the target video, and interaction heat generated for the target video such as likes, comments, forwarding, and collections, etc.

Therefore, in a creation-oriented content ecosystem scenario, the three stages involved from the video creation end to the video publishing end under this scenario constitute the entire link from the video creation end to the video publishing end, and the video editing template is mined based on the heat of the three stages involved in the entire link, which expands the consideration factors for the heat of candidate video editing templates, so as to more accurately mine a video editing template. This method can be applied to a mode for pushing a video template in creation-oriented content ecological scenarios, and the reliability of the mode for pushing a video template is ensured at the same time.

Based on the above link for mining a video template, embodiments of the present disclosure provide a method for pushing a video template, the method is applied to a client, and the client may include a video creation end and a video publishing end. The method will be introduced below in combination with specific embodiments.

Figure 2:
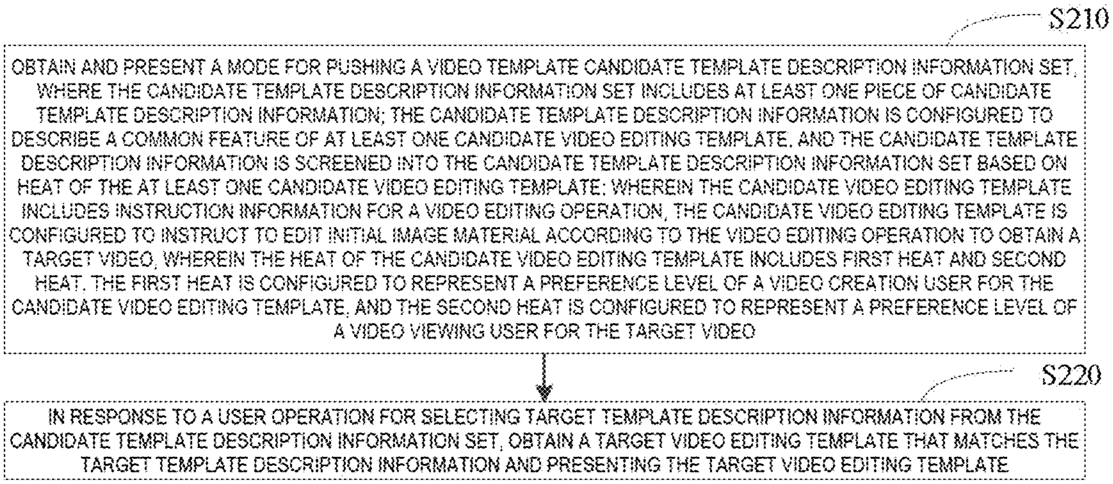
FIG. 2 is a schematic flowchart of a method for pushing a video template provided by an embodiment of the present disclosure.

FIG. 2 is a schematic flowchart of a method for pushing a video template provided in embodiments of the present disclosure. The method can be executed by an apparatus for pushing a video template, the apparatus can be implemented in software and/or hardware and can generally be integrated in a client. As shown in FIG. 2, the method includes:

S210, obtaining and presenting a mode for pushing a video template candidate template description information set, where the candidate template description information set includes at least one piece of candidate template description information; the candidate template description information is configured to describe a common feature of at least one candidate video editing template, and the candidate template description information is screened into the candidate template description information set based on heat of the at least one candidate video editing template; wherein the candidate video editing template includes instruction information for a video editing operation, the candidate video editing template is configured to instruct to edit initial image material according to the video editing operation to obtain a target video, where the heat of the candidate video editing template includes first heat and second heat, the first heat is configured to represent a preference level of a video creation user for the candidate video editing template, and the second heat is configured to represent a preference level of a video viewing user for the target video.

In the present embodiment, when a video creation user wants to perform video creation in a creation-oriented content ecosystem scenario, a client (i.e., video creation end) obtains in advance a candidate template description information set from a server, or, the client obtains the candidate template description information set from the server upon receiving a trigger operation from the video creation user. Then, the candidate template description information set is presented on a creation interface for a video creation user to select.

At least one piece of candidate template description information included in the candidate template description information set can be understood as a hotspot served by the server to the client.

Specifically, after the server obtaining heat of the at least one candidate video editing template, the server firstly selects a predetermined number of candidate video editing templates with higher heat, or selects candidate video editing templates with heat exceeding a predetermined heat threshold; and then the server extracts keywords and/or hotspots from the candidate video editing templates using natural language processing technology to obtain a predetermined number of pieces of candidate template description information with higher heat, or obtain candidate template description information with heat exceeding a predetermined heat threshold; further, the server forms a candidate template description information set in a descending order of heat, and sends the candidate template description information set to the client, so that the client presents the selected template description information set in form of a list on the creation interface. The predetermined heat threshold and the predetermined number can be determined in advance based on experience.

For example, if the server determines three pieces of candidate template description information, including "the only pure white jasmine flower", "the end of the whole play", and "so how long is forever", and the corresponding heat of "the only pure white jasmine", "the end of the whole play" and "so how long is forever" decreases in turn, the server will rank the three pieces of candidate template description information in a descending order of heat to form a candidate template description information set, and sends the candidate template description information set containing these three pieces of candidate template description information to the client, so that the client presents the three pieces of candidate template description information of "the only pure white jasmine", "the end of the whole play", and "so how long is forever" in form of a list on the creation interface.

The common feature can be understood as topics of hotspots, such as, Children's Day, Christmas, jasmine flowers, etc.

The instruction information for a video editing operation can be understood as text information that guides the video creation user to edit the initial image material.

Optionally, the initial image material may be a picture or video.

Optionally, the instruction information for a video editing operation may specifically include: cutting the same style, selecting photos or videos, editing, exporting, and saving and sharing without watermarks.

For example, video creation users may edit photos or videos on the client based on instructions of the candidate video editing template and following instruction information such as cutting the same style, selecting photos or videos, editing, exporting, and saving and sharing without watermarks. Then, the client obtains the edited target video.

The heat of the candidate video editing template can be understood as the consumption heat corresponding to the template video, which specifically includes first heat and second heat.

The preference level represented by the first heat can be understood as a preference level of the video creation user for using the candidate video editing template for video editing processing. The preference level can also be understood as creation heat of the candidate video editing template at the video creation end, so that the first heat characterizes the creation heat of the candidate video editing template at the video creation end.

The preference level represented by the second heat is a preference level of the video viewing user for viewing the target video. The preference level can be understood as viewing heat of the target video created using the candidate video editing template at the video publishing end, so that the second heat characterizes the viewing heat of the target video created using the candidate video editing template at the video publishing end.

Therefore, the heat of the candidate video editing template can be determined based on the heat on the entire link including the video creation end and the video publishing end, thereby expanding the consideration factors of the heat of the candidate video editing template, and thus the heat of the candidate video editing template heat can be calculated more accurately.

S220, in response to a user operation for selecting target template description information from the candidate template description information set, obtaining a target video editing template that matches the target template description information and presenting the target video editing template.

In the present embodiment, after the client presents the candidate template description information set on the creation interface, the video creation user can trigger any piece of the candidate template description information in the candidate template description information set and take it as the target template description information, and transmit the target template description information to the server, so that the server matches a target video editing template based on the target template description information, and pushes the target video editing template to the client. The client can present the target video editing template to a video creation user, so that video creation user creates a video based on the target video editing template and publish the created video.

The user operation can be understood as a triggering operation by the user for the target template description information. Optionally, the user operation can be one of a click operation and a double-click operation.

The target template description information can be understood as hotspots presented on the creation interface of the client.

The target video editing template can be understood as a template video corresponding to the target template description information and used by video creation users to perform secondary creation.

For example, the client presents three pieces of candidate template description information in form of a list on the creation interface, including "the only pure white jasmine flower", "the end of the whole play", and "so how long is forever". If the client receives a user operation for the candidate template description information of "the only pure white jasmine flower", the candidate template description information of "the only pure white jasmine flower" is used as the target template description information, and the candidate template description information "the only pure white jasmine flower" is sent to the server, so that the server matches a video editing template corresponding to "the only pure white jasmine flower" based on the candidate template description information of "the only pure white jasmine flower", takes it as the target video editing template, and pushes the video editing template corresponding to "the only pure white jasmine flower" to the client. The client can present the video editing template corresponding to "the only pure white jasmine flower" to the video creation user, so that video creation user performs video creation based on the video editing template corresponding to "the only pure white jasmine flower" and publish the created video corresponding to "the only pure white jasmine flower".

Therefore, the target video editing template that is ultimately pushed to the video creation user can be determined through human-machine interaction and interaction between the client and the server, so that the video creation user can create and publish videos at the video creation end in the content ecology scenario oriented to creation.

The method for pushing a video template provided in the present disclosure includes: obtaining and presenting a candidate template description information set, wherein the candidate template description information set includes at least one piece of candidate template description information; the candidate template description information is configured to describe a common feature of at least one candidate video editing template, and the candidate template description information is screened into the candidate template description information set based on heat of the at least one candidate video editing template; wherein the candidate video editing template includes instruction information for a video editing operation, the candidate video editing template is configured to instruct to edit initial image material according to the video editing operation to obtain a target video, wherein the heat of the candidate video editing template includes first heat and second heat, the first heat is configured to represent a preference level of a video creation user for the candidate video editing template, and the second heat is configured to represent a preference level of a video viewing user for the target video; and in response to a user operation for selecting target template description information from the candidate template description information set, obtaining a target video editing template that matches the target template description information and presenting the target video editing template. By adopting the above technical solution, the first heat may characterize creation heat of the candidate video editing template at the video creation end, and the second heat can characterize viewing heat of the target video created using the candidate video editing template at the video publishing end. In this way, the heat of the candidate video editing template can be determined based on the heat of the entire link including the video creation end and the video publishing end, thereby expanding consideration factors for the heat of the candidate video editing template. Therefore, the heat of the candidate video editing template can be calculated more accurately, which further improves the accuracy of the candidate template description information set obtained based on the heat screening. Finally, the target video editing template can be more accurately determined based on the candidate template description information set, and the target video editing template can be presented at the video creation end for users to use for video creation and publishing. Therefore, this method can be applied to a mode for pushing a video template in a creation-oriented content ecological scenario, and the reliability of the mode for pushing a video template is ensured at the same time.

It can be understood that since the heat of candidate template description information is dynamically changed, it is likely that as the candidate template description information spread, some candidate template description information becomes more popular, and other candidate template description information will no longer be liked by video viewing users. If the candidate template description information set is not adjusted in time, some candidate template description information with rapidly rise in heat will not be able to be listed or ranked at the top of the list, that is, these pieces of candidate template description information will not be pushed to users, and other candidate template description information with rapidly decrease in heat will continue to occupy the top of the list or continue to be listed, resulting in a problem of resource waste.

In order to avoid the problem of resource waste, it is necessary to update the candidate template description information set in real time, that is, dynamically adjusting the candidate template description information set. In embodiments of the present disclosure, optionally, the method further includes: after executing S220, obtaining and presenting an updated candidate template description information set, where the updated candidate template description information set includes updated candidate template description information, and the updated candidate template description information is screened into the updated candidate template description information set based on updated heat of the at least one candidate video editing template.

The updated candidate template description information includes instruction information for a video editing operation, and the candidate video editing template is configured to instruct to edit initial image material according to the video editing operation to obtain the updated target video.

The heat of the updated candidate video editing template may include an updated first heat and an updated second heat, and the updated first heat is configured to represent the preference level of the video creation user for the updated candidate video editing template, and the updated second heat is configured to represent the preference level of the video viewing user for the updated target video.

Therefore, the candidate template description information set presented on the client can be continuously updated, so that the candidate template description information with rapid increase in heat will continue to be listed or ranked at the top of the list, and the candidate template description information with rapid decrease in heat will not occupy the top of the list or will not continue to be listed, solving the problem of resource waste.

In another embodiment of the present disclosure, the dimensions for characterizing the heat of the candidate video editing template are hierarchical and diverse, and the heat of the candidate video editing template can be calculated based on heat at a plurality of levels and dimensions.

Multi-level refers to that the heat of a piece of candidate template description information is not only related to its own search heat, but also to the heat of its corresponding candidate video editing template and the heat of the material used. Multi-dimensional refers to that the heat of a piece of candidate template description information can be divided from sources into heat at creation side and heat at submission side. Distribution channels may include search heat and recommendation heat, and the heat can be determined based on playback heat, like heat, export heat, and submission heat.

For example, the candidate template description information is "spring". This candidate template description information is associated with candidate video editing templates related to "spring". The reason why these candidate video editing templates are popular may be due to the usage of popular material, such as a background music or a special effect gameplay. At the same time, the reason why these candidate video editing templates are popular may also be that at the video creation end or video publishing end included in the client, many users have generated user-exclusive secondary creation videos based on the candidate video editing templates, that is, generating target videos. In addition, the reason why these candidate video editing templates are popular may also be that the candidate video editing templates become popular videos at the video publishing end (such as one or more of the like heat, comment heat, forward heat, and collection heat are higher), and accordingly these candidate video editing templates become popular. Therefore, it can be said that the dimensions for characterizing the first and second heat corresponding to the candidate video editing template are hierarchical and diverse.

In some embodiments of the present disclosure, the first heat is determined based on first usage heat, second usage heat, and first interaction heat;

The first usage heat is configured to represent a preference level of the video creation user for using at least part of material on the candidate video editing template for video creation, and the second usage heat is configured to represent a preference level of the video creation user for using the candidate video editing template for video creation; and the first interaction heat is configured to represent a preference level of the video creation user for performing an interaction operation on the candidate video editing template.

The first usage heat can be determined based on the usage of at least part of material on the candidate video editing template. Specifically, the usage of at least part of material on the candidate video editing template can be collected in the video creation stage in FIG. 1.

Optionally, at least part of the material includes, but are not limited to, one or more of music, stickers, special effects, gameplay, and filters.

The second usage heat can be determined based on the usage of candidate video editing templates at the video creation end included in the client. Specifically, the usage of candidate video editing templates can be collected in the video creation stage in FIG. 1.

The first interaction heat can be determined by weighting and summing the interaction heat corresponding to a plurality of interaction operations generated for the candidate video editing template at the video creation end included in the client. Specifically, the interaction heat generated for the candidate video editing template can be collected in the template consumption stage in FIG. 1.

Optionally, the interaction operation for the candidate video editing template includes, but is not limited to, one or more of a liking operation, commenting operation, forwarding operation, and collecting operation, and the first interaction heat can be determined based on one or more of like heat, comment heat, forward heat and collection heat.

Therefore, the first heat can be calculated based on the first usage heat generated when using at least part of the material, the second usage heat generated when using the candidate video editing template for video creation, and the first interaction heat generated when interacting with the candidate video editing template, thereby the accuracy of the first heat is improved.

In other embodiments of the present disclosure, the second heat is determined based on first viewing heat, second viewing heat, and second interaction heat.

The first viewing heat is configured to represent a preference level of the video viewing user for viewing an associated video including at least part of material in the target video, and the second viewing heat is configured to represent a preference level of the video viewing user for viewing the target video; and the second interaction heat is configured to represent a preference of the video viewing user for performing an interaction operation on the target video.

The first viewing heat can be determined based on the viewing amount of the associated video by the video viewing users at the video publishing end. Specifically, the first viewing heat can be collected in the video publishing stage in FIG. 1.

The associated video refers to a video including at least part of the material in the target video. For example, if the target video is a Christmas video and the associated video includes a Christmas tree video and a Santa Claus video, then the material that is included in both the associated video and the target video can be one or more of the Christmas tree and Santa Claus.

Optionally, part of corresponding material in the target video and associated video including, but not limited to, one or more of music, stickers, special effects, gameplay, filters.

The second viewing heat can be determined based on the viewing amount of the target video by the video viewing user at the video publishing end. Specifically, the second viewing heat can be collected in the video publishing stage in FIG. 1.

The second interaction heat can be determined based on the interaction heat generated when the video viewing user performs interaction operation on the target video at the video publishing end. Specifically, the second interaction heat can be collected during the video publishing stage in FIG. 1.

Optionally, the interaction operation for the target video includes, but is not limited to, one or more of the liking operation, commenting operation, forwarding operation, and collecting operation, and the second interaction heat can be determined based on one or more of the like heat, comment heat, forward heat, and collection heat.

Therefore, the second heat can be calculated based on the first viewing heat generated when viewing the associated video containing at least part of the material, the second viewing heat generated when viewing the target video, and the second interaction heat generated when interacting with the target video, so that the accuracy of the second heat is improved.

Furthermore, the heat of candidate video editing templates also includes:

search heat configured to represent a preference level of the video creation user for searching for the candidate video editing template;

and/or, recommendation heat configured to represent a preference level for recommending the candidate video editing template to the video creation user;

and/or, click heat configured to represent a preference level of the video creation user for clicking on the candidate video editing template.

The search heat can be determined based on the number of searches of a plurality of video creation users for the candidate video editing template in the search scenario. Specifically, the search heat can be collected during the template consumption stage in FIG. 1.

The recommendation heat refers to the recommendation value of the candidate video editing template determined in a recommendation scenario. Specifically, the recommendation heat can be collected during the template consumption stage in FIG. 1.

The click heat can be determined based on the click ratio of the video creation user for a plurality of candidate video editing templates containing part of the same material and the heat of each candidate video editing template. Specifically, the click heat can be collected during the template consumption stage in FIG. 1.

For example, if a plurality of candidate video editing templates include Spring Video (the click rate is 60%, heat is A1), All Things Revive Video (the click rate is 20%, heat is A2), Spring Video (the click rate is 10%, heat is A3), and Beginning of Spring Video (the click rate is 10%, heat is A4), then the click heat of the plurality of candidate video editing templates=60%*A1+20%*A2+10%*A3+10%*A4.

Therefore, in addition to determining the heat of the candidate video editing template based on the first and second heat, it can also be calculated based on one or more of the search heat generated when the video creation user searches for the candidate video editing template, the recommendation heat generated when recommending the candidate video editing template to the video creation user, and the click heat generated when the video creation user clicks the candidate video editing template, thus improving the consideration factors when calculating the heat of the candidate video editing template.

In summary, the heat of candidate video editing template can be calculated based on the heat at multiple levels and dimensions, which is conducive to improving the accuracy of the heat of the candidate video editing template.

Based on the above link for mining a video template, embodiments of the present disclosure provide a method for pushing a video template, which is applied to a server. The method is described below in combination with specific embodiments.

Figure 3:
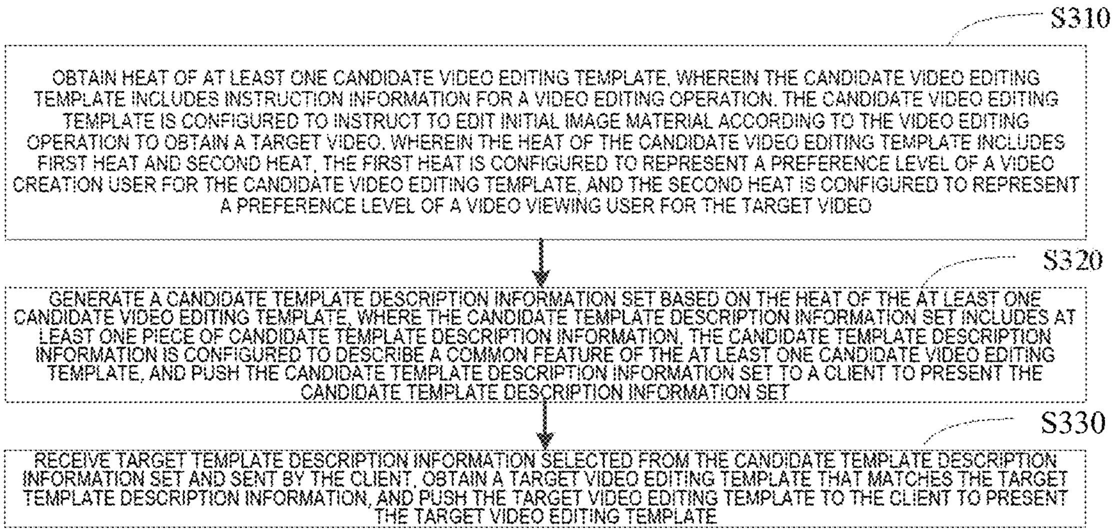
FIG. 3 is a schematic flowchart of another method for pushing a video template provided by an embodiment of the present disclosure.

FIG. 3 is a schematic flowchart of another method for pushing a video template provided by embodiments of the present disclosure. The method can be performed by an apparatus for pushing a video template, which can be implemented in software and/or hardware and generally can be integrated in a server. As shown in FIG. 3, the method includes:

S310, obtaining heat of at least one candidate video editing template, wherein the candidate video editing template includes instruction information for a video editing operation, the candidate video editing template is configured to instruct to edit initial image material according to the video editing operation to obtain a target video, wherein the heat of the candidate video editing template includes first heat and second heat, the first heat is configured to represent a preference level of a video creation user for the candidate video editing template, and the second heat is configured to represent a preference level of a video viewing user for the target video.

In the present embodiment, when a video creation user wants to perform video creation in a creation-oriented content ecosystem scenario, the server needs to determine heat of at least one candidate video editing template, based on heat of the at least one candidate video editing template generated at the video creation end and the video publishing end included in the client, so that the candidate template description information set pushed to the client is determined based on the heat of the candidate video editing template, so that the candidate template description information set is further presented on the creation interface for video creation user to select.

The instruction information for a video editing operation can be understood as text information that guides video creator users to edit the initial image material.

Optionally, the initial image material may be a picture or video.

Optionally, the instruction information for a video editing operation may specifically include: cutting the same style, selecting photos or videos, editing, exporting, and saving and sharing without watermarks.

For example, video creation users can edit photos or videos on the client based on instructions from candidate video editing templates, following instruction information such as cutting the same style, selecting photos or videos, editing, exporting, and saving and sharing without watermarks. Then, the client obtains the edited target video.

The heat of the candidate video editing template can be understood as the consumption heat corresponding to the template video, which specifically includes first heat and second heat.

The preference level represented by the first heat can be understood as a preference level of the video creation user for using the candidate video editing template for video editing processing. The preference level can also be understood as creation heat of the candidate video editing template at the video creation end, so that the first heat characterizes the creation heat of the candidate video editing template at the video creation end.

The preference level represented by the second heat is a preference level of the video viewing user for viewing the target video. The preference level can be understood as viewing heat of the target video created using the candidate video editing template at the video publishing end, so that the second heat characterizes the viewing heat of the target video created using the candidate video editing template at the video publishing end.

Therefore, the heat of the candidate video editing template can be determined based on the heat of the entire link including the video creation end and the video publishing end, thereby expanding the consideration factors of the heat of the candidate video editing template, and thus the heat of the candidate video editing template heat can be calculated more accurately.

S320, generating a candidate template description information set based on the heat of the at least one candidate video editing template, wherein the candidate template description information set includes at least one piece of candidate template description information, the candidate template description information is configured to describe a common feature of the at least one candidate video editing template, and pushing the candidate template description information set to a client to present the candidate template description information set.

Specifically, after the server obtaining heat of the at least one candidate video editing template, the server firstly selects a predetermined number of candidate video editing templates with higher heat, or selects candidate video editing templates with heat exceeding a predetermined heat threshold; and then the server extracts keywords and/or hotspots from the candidate video editing templates using natural language processing technology to obtain a predetermined number of pieces of candidate template description information with higher heat, or obtain candidate template description information with heat exceeding a predetermined heat threshold; further, the server forms a candidate template description information set in a descending order of heat, and sends the candidate template description information set to the client, so that the client presents the selected template description information set in form of a list on the creation interface. The predetermined heat threshold and the predetermined number can be determined in advance based on experience.

At least one piece of candidate template description information included in the candidate template description information set can be understood as a hotspot served by the server to the client.

For example, if the server determines three pieces of candidate template description information, including "the only pure white jasmine flower", "the end of the whole play", and "so how long is forever", and the corresponding heat of "the only pure white jasmine", "the end of the whole play" and "so how long is forever" decreases in turn, the server will rank the three pieces of candidate template description information in a descending order of heat to form a candidate template description information set, and sends the candidate template description information set containing these three pieces of candidate template description information to the client, so that the client presents the three pieces of candidate template description information of "the only pure white jasmine", "the end of the whole play", and "so how long is forever" in form of a list on the creation interface.

The common feature can be understood as topics of hotspots, such as, Children's Day, Christmas, jasmine flowers, etc.

Therefore, a candidate template description information set can be generated based on the heat of at least one candidate video editing template on the entire link, which improves the accuracy of the candidate template description information set.

S330, receiving target template description information selected from the candidate template description information set and sent by the client, obtaining a target video editing template that matches the target template description information, and pushing the target video editing template to the client to present the target video editing template.

In the present embodiment, after the client presents the candidate template description information set, the client can select target template description information from the candidate template description information set based on the user operation sent by the video creation user, and send the target template description information to the server; the server can determine a target video editing template that matches the target template description information from the at least one candidate video editing template, and then the server can send the target video editing template to the client, so that the target video editing template presents the target video editing template, so that video creation user creates a video based on the target video editing template and publish the created video.

The user operation can be understood as a triggering operation by the user for the target template description information. Optionally, the user operation can be one of a click operation and a double-click operation.

The target template description information can be understood as hotspots presented on the creation interface of the client.

The target video editing template can be understood as a template video corresponding to the target template description information and used by video creation users to perform secondary creation.

For example, the client presents three pieces of candidate template description information in form of a list on the creation interface, including "the only pure white jasmine flower", "the end of the whole play", and "so how long is forever". If the client receives a user operation for the candidate template description information of "the only pure white jasmine flower", the candidate template description information of "the only pure white jasmine flower" is used as the target template description information, and the candidate template description information "the only pure white jasmine flower" is sent to the server, so that the server matches a video editing template corresponding to "the only pure white jasmine flower" based on the candidate template description information of "the only pure white jasmine flower", takes it as the target video editing template, and pushes the video editing template corresponding to "the only pure white jasmine flower" to the client. The client can present the video editing template corresponding to "the only pure white jasmine flower" to the video creation user, so that video creation user performs video creation based on the video editing template corresponding to "the only pure white jasmine flower" and publish the created video corresponding to "the only pure white jasmine flower".

Therefore, the target video editing template that is ultimately pushed to the video creation user can be determined through interaction between the client and the server, so as to achieve video creation and publishing by the video creation user at the video creation end in a creation-oriented content ecosystem scenario.

Therefore, through the interaction between the client and the server, the target video editing template that is ultimately pushed to the video creation user can be determined, so that the video creation user can create and publish videos at the video creation end in the content ecology scenario oriented to creation.

The method for pushing a video template according to embodiments of the present disclosure includes obtaining heat of at least one candidate video editing template, where the candidate video editing template includes instruction information for a video editing operation, the candidate video editing template is configured to instruct to edit initial image material according to the video editing operation to obtain a target video, wherein the heat of the candidate video editing template includes first heat and second heat, the first heat is configured to represent a preference level of a video creation user for the candidate video editing template, and the second heat is configured to represent a preference level of a video viewing user for the target video; generating a candidate template description information set based on the heat of the at least one candidate video editing template, wherein the candidate template description information set includes at least one piece of candidate template description information, the candidate template description information is configured to describe a common feature of the at least one candidate video editing template, and pushing the candidate template description information set to a client to present the candidate template description information set; and receiving target template description information selected from the candidate template description information set and sent by the client, obtaining a target video editing template that matches the target template description information, and pushing the target video editing template to the client to present the target video editing template. By adopting the above technical solution, the first heat may characterize creation heat of the candidate video editing template at the video creation end, and the second heat can characterize viewing heat of the target video created using the candidate video editing template at the video publishing end. In this way, the heat of the candidate video editing template can be determined based on the heat of the entire link including the video creation end and the video publishing end, thereby expanding consideration factors for the heat of the candidate video editing template. Therefore, the heat of the candidate video editing template can be calculated more accurately, which further improves the accuracy of the candidate template description information set obtained based on the heat screening. Finally, the target video editing template can be more accurately determined based on the candidate template description information set, and the target video editing template can be presented at the video creation end for users to use for video creation and publishing. Therefore, this method can be applied to a mode for pushing a video template in a creation-oriented content ecological scenario, and the reliability of the mode for pushing a video template is ensured at the same time.

It can be understood that since the heat of the candidate template description information is dynamically changed, it is necessary to monitor the candidate template description information in real time, and continuously update the candidate template description information set according to the monitoring result.

In embodiments of the present disclosure, optionally, the method further includes: after performing S330, obtaining a consumption posterior index indicating usage of the video viewing user for the candidate video editing template that matches the candidate template description information during an observation window period; and adjusting the heat of the candidate video editing template based on the consumption posterior index, and updating the candidate template description information set based on the adjusted heat.

Specifically, based on the consumption posterior index of the observation window period, the heat of the adjusted candidate video editing templates can be reranked, and the candidate template description information set can be updated according to the heat of the adjusted candidate video editing templates obtained by reranking, so as to achieve real-time monitoring of the candidate template description information and continuously update of the candidate template description information set according to the monitoring results.

The observation window period can be a dynamic adjustment period for hotspots. Optionally, the observation window period can be a preset fixed time period or a self-adaptation time period corresponding to different candidate template description information.

The consumer posterior index can be user attention used for the candidate video editing template that matches the candidate template description information. Specifically, the user attention can be determined based on the click heat, like heat, view heat, comment heat, forward heat and collection heat of the target video, after the target video generated based on the candidate video editing template is published. The user attention may also be calculated based on a plurality of parameters including click heat, video browsing progress, and video browsing depth of an associated video including at least part of the material of the target video.

Figure 4:
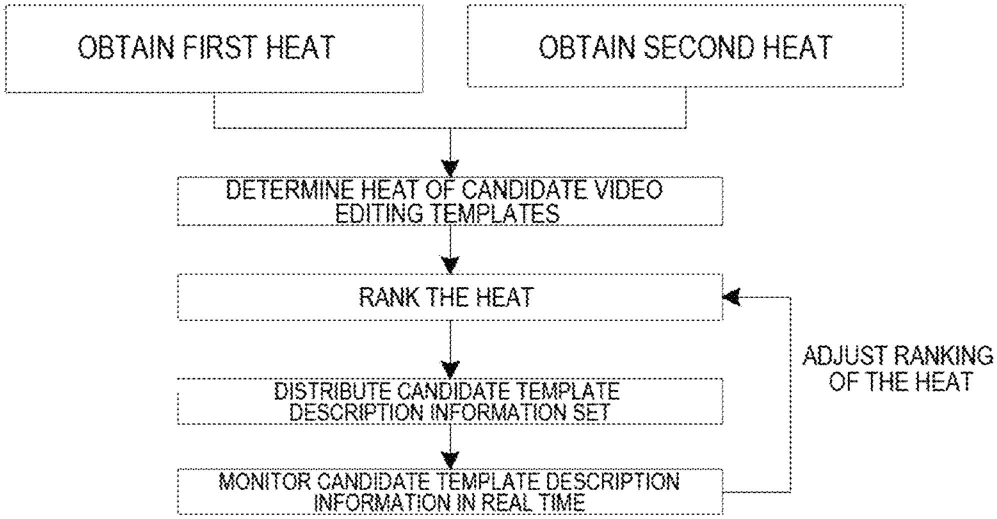
FIG. 4 is a logical schematic diagram of a method for updating a candidate template description information set provided by an embodiment of the present disclosure.

In order to facilitate understanding of the method for updating the candidate template description information set, FIG. 4 shows a logical schematic diagram of the method for updating the candidate template description information set.

As shown in FIG. 4, first, the first heat for representing the preference level of the video creation user for the candidate video editing template and the second heat for representing the preference level of the video viewing user for the target video are obtained, that is, the creation heat of the candidate video editing template at the video creation end and the viewing heat of the target video created using the candidate video editing template at the video publishing end are determined; then, the heat of at least one candidate video editing template is calculated based on the first heat and the second heat; the heat of at least one candidate video editing template is ranked so as to determine the candidate template description information set based on the ranking result; further, the candidate template description information set is distributed; then, after distributing the candidate template description information set, the consumption posterior index for the usage of the candidate video editing template that matches the candidate template description information is monitored in real time, so that the heat of the adjusted candidate video editing templates are reranked according to the consumption posterior index, and the candidate template description information set is updated according to the heat of the adjusted candidate video editing templates obtained by reranking. The above process is repeated continuously, so as to continuously monitor the consumption posterior index, and continuously update the candidate template description information set presented on the client based on the consumption posterior index.

Therefore, it is possible to continuously monitor the consumption posterior index, and continuously update the candidate template description information set presented on the client based on the consumption posterior index, so that the candidate template description information with rapidly rise in heat will continue to be listed or ranked at the top of the list, and the candidate template description information with rapidly decrease in heat will not occupy the top of the list or will not continue to be on the list, thus solving the problem of resource waste.

In some other embodiments of the present disclosure, the dimensions for characterizing the heat of the candidate video editing template are hierarchical and diverse, and the heat of the candidate video editing template can be calculated based on heat at a plurality of levels and dimensions.

In some embodiments of the present disclosure, obtaining the first heat in the heat of the candidate video editing template includes:

- obtaining first usage heat of the video creation user for using at least part of material on the candidate video editing template for video creation;
- obtaining second usage heat of the video creation user for using the candidate video editing template for video creation;
- obtaining first interaction heat of the video creation user for performing an interaction operation on the candidate video editing template; and
- determining the first heat based on the first usage heat, the second usage heat and the first interaction heat.

The first usage heat is configured to represent a preference level of the video creation user for using at least part of material on the candidate video editing template for video creation. Specifically, the first usage heat can be determined based on the usage of at least part of material on the candidate video editing template.

Optionally, at least some of material includes, but are not limited to, one or more of music, stickers, special effects, gameplay, and filters.

The second usage heat is configured to represent a preference level of the video creation user for using the candidate video editing template for video creation. Specifically, the second usage heat can be determined based on the usage of the candidate video editing template at the video creation end included in the client.

The first interaction heat is configured to represent a preference level of the video creation user for performing an interaction operation on the candidate video editing template. Specifically, the first interaction heat can be determined by weighting and summing the interaction heat corresponding to a plurality of interaction operations for the candidate video editing template at the video creation end included in the client.

Optionally, the interaction operation for the candidate video editing template includes, but is not limited to, one or more of a liking operation, a commenting operation, a forwarding operation, and a collecting operation, and the first interaction heat can be determined based on one or more of the like heat, comment heat, forward heat and collection heat.

Therefore, the first heat can be calculated based on the first usage heat generated when using at least part of the material, the second usage heat generated when using the candidate video editing template for video creation, and the first interaction heat generated when interacting with the candidate video editing template, thereby the accuracy of the first heat is improved.

In other embodiments of the present disclosure, obtaining the second heat in the heat of the candidate video editing template includes:

obtaining first viewing heat of the video viewing user for viewing an associated video including at least part of material in the target video;

obtaining second viewing heat of the video viewing user for viewing the target video;

obtaining second interaction heat of the video viewing user for performing an interaction operation on the target video; and determining the second heat based on the first viewing heat, the second viewing heat, and the second interaction heat.

The first viewing heat is configured to represent the preference level of the video viewing user for viewing the associated video containing at least part of the material in the target video. Specifically, the first viewing heat can be determined based on the number of viewings of the associated video by the video viewing users at the video publishing end.

The associated video refers to a video including at least part of the material in the target video. For example, if the target video is a Christmas video and the associated video includes a Christmas tree video and a Santa Claus video, then the material that is included in both the associated video and the target video can be one or more of the Christmas tree and Santa Claus.

Optionally, part of corresponding material in the target video and associated video including, but not limited to, one or more of music, stickers, special effects, gameplay, filters.

The second viewing heat is configured to represent the preference level of the video viewing user for viewing the target video. Specifically, the second viewing heat can be determined based on the number of viewings of the target video by the video viewing users at the video publishing end.

The second interaction heat is configured to represent the preference level of the video viewing user for performing interaction on the target video. Specifically, the second interaction heat can be determined based on the interaction heat generated when the video viewing user performs interaction operation on the target video at the video publishing end.

Optionally, the interaction operation of the target video includes, but is not limited to, one or more of liking operation, commenting operation, forwarding operation, and collecting operation, and the second interaction heat can be determined based on one or more of the like heat, comment heat, forward heat, and collection heat.

Therefore, the second heat can be calculated based on the first viewing heat generated when viewing the associated video containing at least part of the material, the second viewing heat generated when viewing the target video, and the second interaction heat generated when interacting with the target video, so that the accuracy of the second heat is improved.

In order to further improve the accuracy of the heat of candidate video editing templates, determining search heat based on search information of the video creation user for the candidate video editing template;

and/or, determining recommendation heat based on recommendation information regarding recommending the candidate video editing template to the video creation user;

and/or, determining click heat based on an amount of clicks of the video creation user on the candidate video editing template.

The search heat can be determined based on the amount of searches by a plurality of video creation users for the candidate video editing template in the search scenario.

The recommendation heat refers to the recommendation value of the candidate video editing template determined in a recommendation scenario.

The click heat can be determined based on the click rate of the video creation user for a plurality of candidate video editing templates containing part of the same material and the heat of each candidate video editing template.

Figure 5:
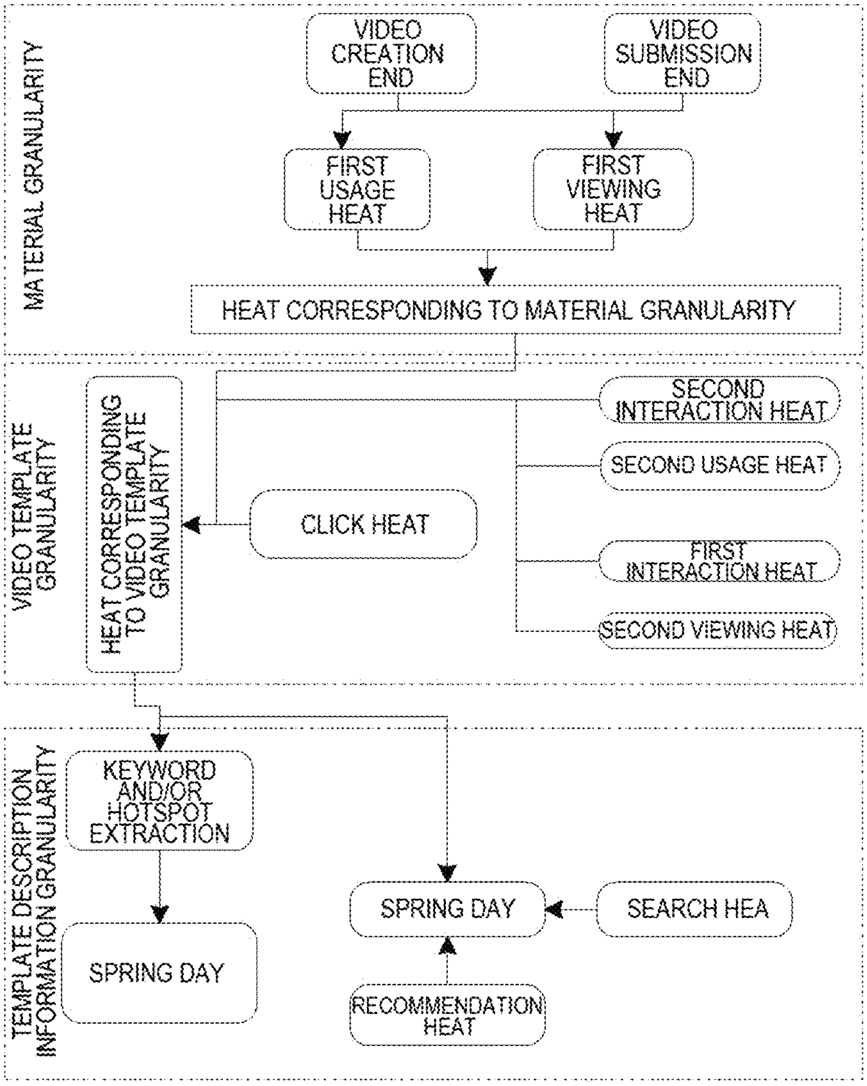
FIG. 5 is a logical schematic diagram of a method for determining target template description information provided by an embodiment of the present disclosure.

In order to understand the calculation logic of the heat of candidate video editing template, FIG. 5 is a logical schematic diagram of a method for determining target template description information.

As shown in FIG. 5, the method for determining target template description information includes: first, determining the heat of at least one candidate video editing template based on one or more of heat corresponding to material granularity, heat corresponding to video template granularity, and heat corresponding to template description information granularity; then, generating a candidate template description information set based on the heat of at least one candidate video editing template.

The heat corresponding to the material granularity can be determined based on the first usage heat generated when the video creation user uses at least part of the material on the candidate video editing template for video creation and the first viewing heat generated when the video viewing user views the associated video containing at least part of the material in the target video. That is to say, the heat corresponding to the material granularity is determined considering the consumption heat of at least part of the material generated at the video creation end and video publishing end.

Optionally, at least part of material may include one or more of music, material, gameplay, special effects, and props, and the first usage heat may include one of music heat, material heat, gameplay heat, special effects heat, and prop heat, or combination thereof.

The heat corresponding to the video template granularity can be determined based on the second usage heat generated when the video creation user uses the candidate video editing template for video creation, the first interaction heat generated when the video creation user performs an interaction operation on the candidate video editing template, the second viewing heat generated when the video viewing user views the target video, the second interaction heat generated when the video viewing user performs an interaction operation on the target video, and the click heat generated when the video creation user clicks on the candidate video editing template. In other words, the consumption heat generated for the candidate video editing template at the video creation and video publishing ends is considered in determining the heat corresponding to the video template granularity.

Optionally, the click heat can be determined based on the weighted sum of the click ratio for a plurality of candidate video editing templates and the heat of each candidate video editing template.

The heat corresponding to the template description information granularity can be determined based on the search heat generated when the video creation user searches for the candidate video editing template and the recommendation heat generated when recommending the candidate video editing template to the video creation user.

Therefore, the heat at a plurality of levels and dimensions is considered in the process of calculating the heat of the candidate video editing template, which is conducive to improving the accuracy of the heat of the candidate video editing template.

In another embodiment of the present disclosure, in many cases, the same candidate template description information is searched using different search terms. The candidate template description information is "spring", and the search terms may be "spring day", "early spring", or "spring March". When these search terms are all used as candidate template description information, there is a certain similarity between the candidate template description information. Therefore, after generating the candidate template description information set, the candidate template description information with high similarity can also be merged or deduplicated.

In embodiments of the present disclosure, optionally, the method further includes: after executing "generating a candidate template description information set based on the heat of the at least one candidate video editing template" in S320:

calculating a similarity between a plurality of pieces of candidate template description information, and comparing the similarity with a predetermined similarity threshold; and if the similarity is greater than the predetermined similarity threshold, merging the plurality of pieces of candidate template description information, and taking candidate template description information corresponding to a candidate video editing template with a maximum heat value as the merged candidate template description information, based on heat of at least one candidate video editing template corresponding to each piece of the candidate template description information.

pushing to the client the candidate template description information set containing the merged candidate template description information.

Accordingly, S330 specifically includes: receiving the target template description information selected from the candidate template description information set containing the merged candidate template description information and sent by the client, obtaining a target video editing template that matches the target template description information, and pushing the target video editing template to the client to present the target video editing template.

In the present embodiment, "calculating the similarity between the plurality of pieces of candidate template description information" specifically includes:

calculating a template similarity between candidate video editing templates corresponding to individual pieces of the candidate template description information;

calculating a semantic similarity between individual pieces of the candidate template description information;

calculating a word similarity between triggering words corresponding to individual pieces of candidate template description information; and calculating the similarity between the plurality of pieces of candidate template description information based on the template similarity, the semantic similarity, and the word similarity.

The template similarity is configured to characterize content similarity of a plurality of candidate video editing templates. It can be understood that if content of the plurality of candidate video editing templates associated with a plurality of candidate template description information highly overlaps, the plurality of candidate template description information may belong to the same hotspot, and the template similarity between the plurality of candidate video editing templates needs to be calculated.

The semantic similarity is configured to characterize the textual similarity of a plurality of candidate video editing templates. Specifically, based on the natural language processing (NLP) model, the semantic similarity between the plurality of candidate video editing templates can be calculated.

The word similarity is configured to characterize the similarity of trigger words of a plurality of candidate video editing templates. It can be understood that if the plurality of trigger words corresponding to the plurality of candidate video editing templates highly overlap or there are a large number of similar trigger words, the similarity between the plurality of candidate video editing templates is high.

Further, weighted aggregation is performed on the template similarity, semantic similarity and word similarity, to obtain a similarity between a plurality of pieces of the candidate template description information; if the similarity is greater than a predetermined similarity threshold, a merging operation is automatically performed on the at least one candidate video editing template based on the heat of the candidate video editing template, or, if the similarity is close to the predetermined similarity threshold, the merging operation are performed on the candidate video editing templates after manual judgment, so that the candidate template description information corresponding to a candidate video editing template having a maximum heat value is used as the merged candidate template description information.

The predetermined similarity threshold is a similarity determined in advance based on experience for determining whether to perform a merging process on the plurality of candidate video editing templates.

Figure 6:
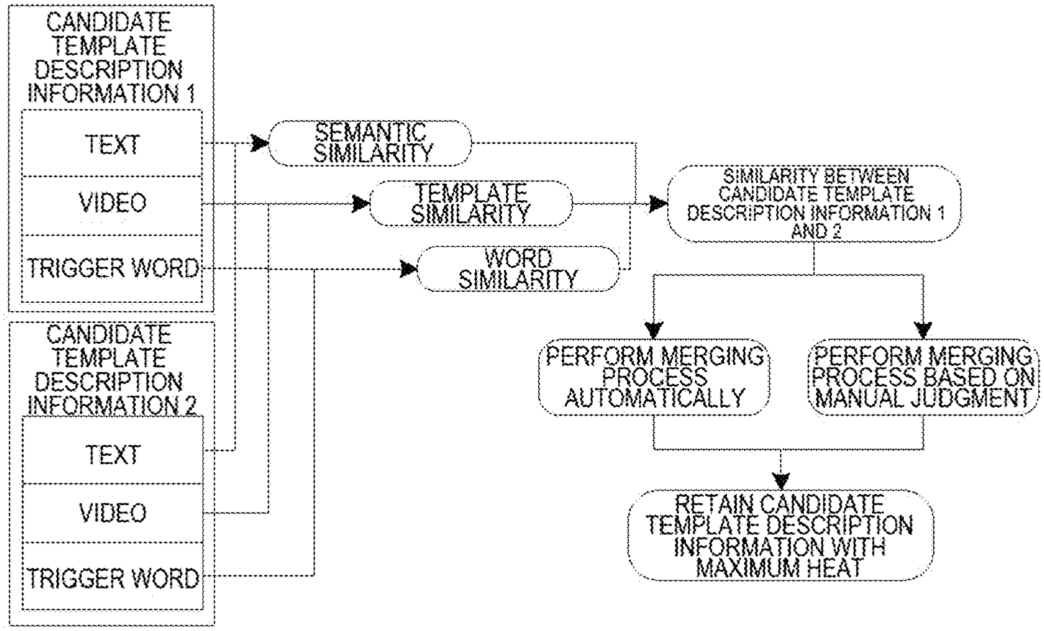
FIG. 6 is a logical schematic diagram of a process for merging candidate template description information provided by an embodiment of the present disclosure.

In order to facilitate understanding of the merging process of candidate template description information, FIG. 6 shows a logical schematic diagram of the merging process of candidate template description information.

As shown in FIG. 6, both candidate template description information 1 and candidate template description information 2 are associated with candidate video editing templates, text, and trigger words. First, the template similarity between candidate template description information 1 and candidate template description information 2, the semantic similarity between candidate template description information 1 and candidate template description information 2, and the word similarity between candidate template description information 1 and candidate template description information 2 are calculated. Then, weighted aggregation is performed on the text similarity, semantic similarity, and word similarity to obtain the similarity between candidate template description information 1 and candidate template description information 2. Next, the similarity between candidate template description information 1 and candidate template description information 2 is compared with a predetermined similarity threshold. If the similarity is greater than the predetermined similarity threshold, the plurality of candidate template description information are automatically merged. If the similarity is close to the predetermined similarity threshold, the merging operation for candidate video editing templates is performed after manual judgment, so that the candidate template description information corresponding to the candidate video editing template having the maximum heat value is taken as the merged candidate template description information.

Therefore, the candidate template description information with higher similarity can be merged or deduplicated to ensure that the process of calculating candidate template description information is more accurate, thereby avoiding affecting the user experience due to pushing the same or similar candidate template description information.

In another embodiment of the present disclosure, the created video at the video creation end included in the client is more homogeneous than that at the video publishing end, and the definition of homogeneous content thereof is different from that of consumer content. For example, although the material used in the two video editing templates are different, as long as there are many similarities in the music, segment number, transition, gameplay, and special effects used, the two candidate video editing templates will still be defined as homogeneous videos, because the video content of the secondary creation videos generated using these two candidate video editing templates is the same or similar. In order to avoid pushing the same candidate video editing template to the client, after determining the heat of the candidate template description information or after merging a plurality of pieces of candidate template description information, deduplication needs to be performed on the candidate video editing templates to reduce the homogenization in creating template videos. In this embodiment, deduplication is performed on a plurality of candidate video editing templates after merging a plurality of pieces of candidate template description information.

After executing "generating a candidate template description information set based on the heat of at least one candidate video editing template" in S320, the method further includes:

- obtaining a plurality of recall video editing templates corresponding to recall reporting description information; and
- performing deduplication on the plurality of candidate video editing templates and the plurality of recall video editing templates to obtain deduplicated templates;
- the candidate template description information is configured to describe the common feature of the deduplicated templates.

In the present embodiment, "obtaining the plurality of recall video editing templates corresponding to the recall reporting description information" specifically includes:

- determining a topic type of the recall reporting description information;
- determining a corresponding template recall mode based on the topic type of the recall reporting description information; and
- recalling the plurality of recall video editing templates from a preset template library based on the template recall mode.

It can be understood that topic types of candidate template description information mined from the creation-oriented content ecosystem scenarios are diverse, and each topic type corresponds to one or more extended text descriptions, and the extended text descriptions of popular topics are used as recall reporting description information. The recall reporting description information can be understood as operation reporting hotspots, and each topic type corresponds to one or more template recall modes. Finally, a plurality of recall video editing templates corresponding to the recall reporting description information are recalled based on the template recall node corresponding to each topic type, and further deduplication processing is performed on the plurality of candidate video editing templates and the plurality of recall video editing templates to obtain deduplicated templates, so that the candidate template description information is used to describe a common feature of the deduplicated templates.

The topic type can be understood as category information of the recall reporting description information. Specifically, the recall reporting description information and its corresponding topic type can be determined based on the operation reporting heat of the recall reporting description information, for example, Spring category, International Workers' Day category, and Mid-Autumn Festival category.

The extended text description can be understood as a descriptor. For example, the candidate template description information is "spring day", and the extended text description includes "spring day", "spring", "all things revive", "spring is full of vitality", etc.

The predetermined video template library refers to a template library including a plurality of template videos.

Optionally, the template recall mode may include a recall mode based on user behavior, a recall mode based on structured features, a recall mode based on multimodal fingerprint features (i.e., content features), and a text-based recall mode.

Specifically, the recall mode based on user behavior is used to recall a plurality of recall video editing templates after the user clicks on the recall reporting description information; the recall method based on structured features is used to recall a plurality of recall video editing templates using part of martial in the same copywriting, music, and gameplay material; the recall mode based on multimodal fingerprint features is used to recall a plurality of recall video editing templates with similar content or style; the text-based recall mode is used to recall a plurality of recalled video editing templates with similar semantics, topics, or copywriting.

Figure 7:
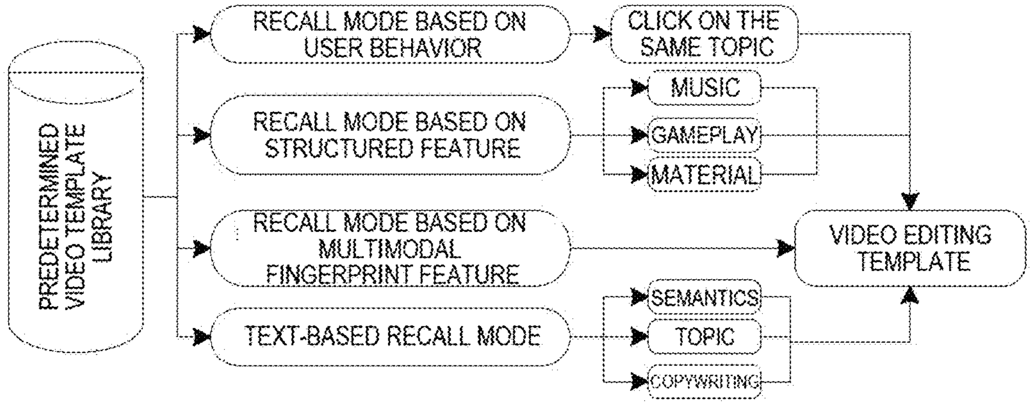
FIG. 7 is a logical schematic diagram of a template recall mode provided by an embodiment of the present disclosure.

In order to facilitate understanding of the template recall mode, FIG. 7 provides a logical schematic diagram of a template recall mode.

As shown in FIG. 7, after obtaining the recall reporting description information, the corresponding video recall mode can be determined based on the topic type of the recall reporting description information, including: one of a recall mode based on user behavior, a recall method based on structured features, a recall mode based on multimodal fingerprint features (i.e., content features) and a text-based recall mode, or a combination thereof; further, the recall mode based on user behavior is used to recall a plurality of recall video editing templates after the user clicks on the recall reporting description information; the recall method based on structured features is used to a plurality of recall video editing templates using part of martial in the same copywriting, music, and gameplay material; the recall mode based on multimodal fingerprint features is used to recall a plurality of recall video editing templates with similar content or style; the text-based recall mode is used to recall a plurality of recalled video editing templates with similar semantics, topics, or copywriting.

In this embodiment, "performing deduplication on the plurality of candidate video editing templates and the plurality of recall video editing template" specifically includes:

- extracting material information from each of the candidate video editing templates and each of the recall video editing templates, and obtaining, based on the material information, content features respectively corresponding to each of the candidate video editing templates and each of the recall video editing templates;
- determining, based on the content features, first similarities between each two templates of the plurality of candidate video editing templates and the plurality of recall video editing templates;

extracting segment information from each of the candidate video editing templates and each of the recall video editing templates, and obtaining, based on the segment information, structural features respectively corresponding to each of the candidate video editing templates and each of the recall video editing templates;

determining, based on the structural features, second similarities between each two templates of the plurality of candidate video editing templates and the plurality of recall video editing templates; and performing deduplication on the plurality of candidate video editing templates and the plurality of recall video editing templates based on the first similarities and the second similarities.

The material information may include video images, audio, and text.

The content feature may be the content fingerprint of the video editing template.

Specifically, the plurality of candidate video editing templates and the plurality of recall video editing templates may be input into a multimodal fingerprint model, material information can be extracted, and the video images, audio, and text in the material information can be characterized and fused to obtain a content feature corresponding to the plurality of candidate video editing templates and the plurality of recall video editing templates. Furthermore, the first similarity between each two templates in the plurality of candidate video editing templates and the plurality of recall video editing templates is determined based on the content feature.

The segmentation information can be the number of segments of the candidate video editing template.

The structural features can be the structural features of the candidate video editing template.

Specifically, structural feature analysis and feature extraction can be performed on a plurality of candidate video editing templates and a plurality of recalled video editing templates. Specifically, segmentation information corresponding to the plurality of candidate video editing templates and the plurality of recall video editing templates respectively is extracted, and then the structural features corresponding to the plurality of candidate video editing templates and the plurality of recall video editing templates respectively are obtained based on the segmentation information. Furthermore, the second similarity between each two templates in the plurality of candidate video editing templates and the plurality of recall video editing templates is determined based on the structural features. It should be noted that the prop feature, gameplay feature, sound effect feature and material feature corresponding to the plurality of candidate video editing templates and the plurality of recall video editing templates can also be extracted, and the structural features corresponding to the plurality of candidate video editing templates and the plurality of recall video editing templates can be obtained based on one or more of the prop features, gameplay features, sound effect features, and material features, thereby, the second similarity can be calculated based on the structural features.

Further, weighted aggregation is performed on the first similarity and the second similarity to obtain aggregation similarity between a plurality of candidate video editing templates, and then deduplication is performed on the plurality of created videos whose aggregation similarity is greater than a predetermined aggregation threshold, and the candidate video editing template with the largest aggregation similarity is retained, and then the deduplication process for the plurality of candidate video editing templates is completed.

The predetermined aggregation threshold is a predetermined similarity based on experience.

Figure 8:
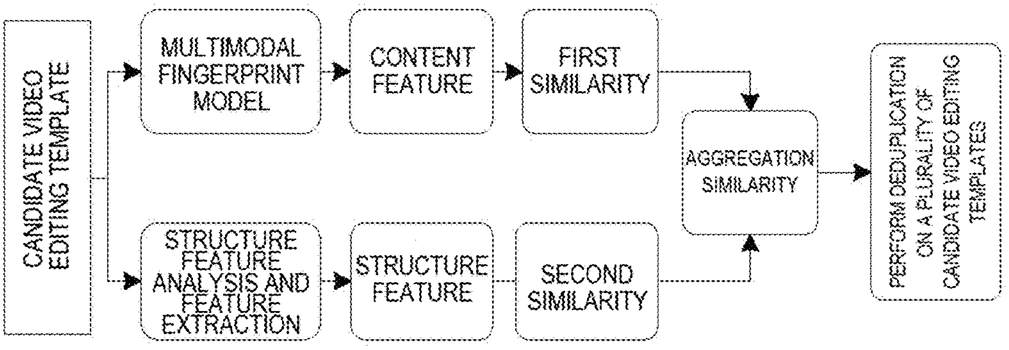
FIG. 8 is logical schematic diagram of a method for performing deduplication on a plurality of candidate video editing templates provided by an embodiment of the present disclosure.

In order to facilitate understanding, FIG. 8 is a logical schematic diagram of the method for performing deduplication on a plurality of candidate video editing templates.

As shown in FIG. 8, by using the multimodal fingerprint model, material information is extracted from a plurality of candidate video editing templates, and content features of candidate video editing templates is obtained based on material information; at the same time, structural feature analysis and feature extraction are performed on the plurality of candidate video editing templates, specifically segmentation information of the plurality of candidate video editing templates is extracted, and then structural features of the candidate video editing templates are obtained based on the segmentation information; further, a first similarity between the plurality of candidate video editing templates is determined based on content features of the plurality of candidate video editing templates, and a second similarity between the plurality of candidate video editing templates is determined based on structural features of the plurality of candidate video editing templates; finally, weighted aggregation is performed on the first similarity and the second similarity to obtain the aggregation similarity between a plurality of created videos, deduplication is performed on the plurality of created videos whose aggregation similarity is greater than a predetermined aggregation threshold, and the created video with the highest aggregation similarity is retained, and then the deduplication process for the plurality of candidate video editing templates is completed.

Therefore, by performing deduplication on the candidate video editing templates, the server can reduce the homogeneity of the candidate video editing templates, thereby avoid pushing the same or similar candidate video editing templates to the client, and avoid presenting a large number of identical or similar candidate video editing templates to the user, which ultimately helps to improve the user's video creation experience.

Figure 9:
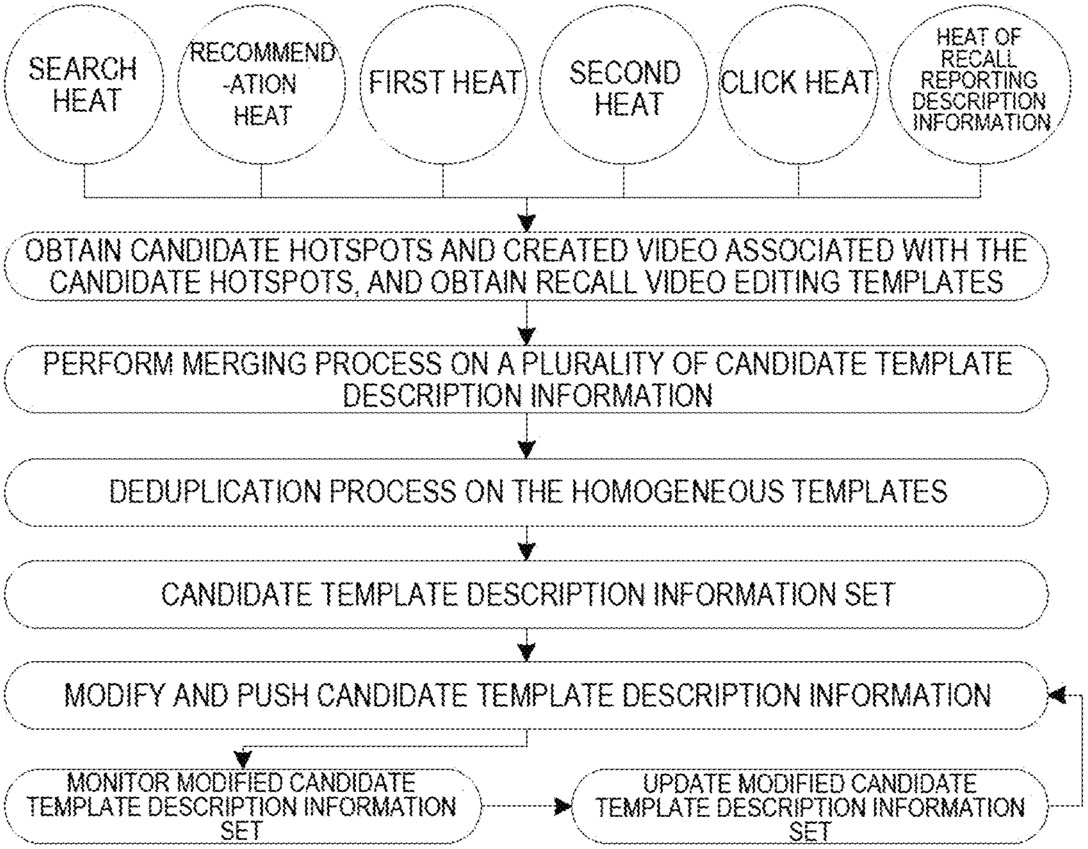
FIG. 9 is a logical schematic diagram of a process for pushing a video template provided by an embodiment of the present disclosure.

In another embodiment of the present disclosure, the process of pushing the video template is explained as a whole. FIG. 9 shows a logical schematic diagram of the process of pushing the video template. The method for pushing a video template shown in FIG. 9 is executed by the server.

As shown in FIG. 9, first, search heat, recommendation heat, first heat, second heat, click heat, heat of recall reporting description information are obtained. Optionally, off-end hotspot monitoring heat may also be obtained.

Next, original hotspot mining is performed based on the above obtained hotspots, and candidate hotspots and created videos associated to the candidate hotspots are obtained. Specifically, a candidate template description information set is generated based on the heat of at least one candidate video editing template. The heat of at least one candidate video editing template includes search heat, recommendation heat, first heat, second heat, and click heat. Optionally, the heat of at least one candidate video editing template may also include off-end hotspot monitoring heat. It should be noted that the specific implementation of generating the candidate template description information set can refer to the description of the previous embodiments, which will not be repeated here.

Next, the plurality of pieces of candidate template description information in the plurality of candidate template description information sets are merged and processed, and the candidate template description information corresponding to the candidate video editing template with the maximum heat value is used as the merged candidate template description information, and then the candidate video editing template corresponding to the merged candidate template description information is further obtained. It should be noted that the specific implementation of the process of merging the candidate template description information can refer to the description of the aforementioned embodiment, which will not be repeated here.

Next, the recall reporting description information and its corresponding topic type are determined based on the heat of recall reporting description information, and then a plurality of recall video editing templates are recalled from a predetermined template library according to the topic type of the recall reporting description information.

Furthermore, a plurality of recall video editing templates corresponding to the recall reporting description information and candidate video editing templates corresponding to the merged candidate template description information are fused.

Furthermore, deduplication processing is performed on a plurality of recall video editing templates and candidate video editing templates corresponding to the merged candidate template description information to achieve the deduplicate process for homogeneous templates.

Further, based on the heat of the candidate video editing template obtained after homogenization deduplication processing, a candidate template description information set is generated.

Furthermore, one or more pieces of candidate template description information in the candidate template description information set is edited to modify the candidate template description information so as to form a modified candidate template description information set.

Furthermore, the modified candidate template description information set is sent to the client, so that the client presents the modified candidate template description information set, achieving pushing of the candidate template description information.

Finally, the consumption posterior index corresponding to the modified candidate template description information set is monitored, and the modified candidate template description information set presented on the client is continuously updated based on the consumption posterior index. It should be noted that the specific implementation of monitoring and updating the modified candidate template description information set can refer to the description of the previous embodiment, which will not be repeated here.

Figure 10:
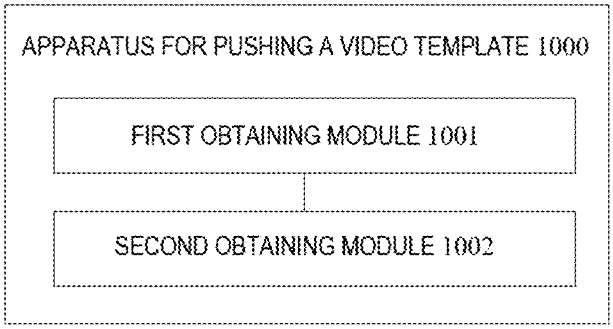
FIG. 10 is a structural schematic diagram of an apparatus for pushing a video template provided by an embodiment of the present disclosure.

FIG. 10 is a structural schematic diagram of an apparatus for pushing a video template provided in embodiments of the present disclosure. The apparatus can be implemented by software and/or hardware and is configured in the client. As shown in FIG. 10, the apparatus 1000 for pushing the video template includes:

a first obtaining module 1001 configured to obtain and present a candidate template description information set, where the candidate template description information set includes at least one piece of candidate template description information; the candidate template description information is configured to describe a common feature of at least one candidate video editing template, and the candidate template description information is screened into the candidate template description information set based on heat of the at least one candidate video editing template; wherein the candidate video editing template includes instruction information for a video editing operation, the candidate video editing template is configured to instruct to edit initial image material according to the video editing operation to obtain a target video, wherein the heat of the candidate video editing template includes first heat and second heat, the first heat is configured to represent a preference level of a video creation user for the candidate video editing template, and the second heat is configured to represent a preference level of a video viewing user for the target video.

a second obtaining module 1002 configured to obtain, in response to a user operation for selecting target template description information from the candidate template description information set, a target video editing template that matches the target template description information, and present the target video editing template.

The apparatus for pushing the video template provided in the present disclosure obtains and presents a set of candidate template description information; where, the candidate template description information set includes at least one piece of candidate template description information, the candidate template description information is configured to describe a common feature of at least one candidate video editing template, and the candidate template description information is screened into the candidate template description information set based on heat of the at least one candidate video editing template, where, the candidate video editing template includes instruction information for a video editing operation, the candidate video editing template is configured to instruct to edit initial image material according to the video editing operation to obtain a target video, where, the heat of the candidate video editing template includes first heat and second heat, the first heat is configured to represent a preference level of a video creation user for the candidate video editing template, and the second heat is configured to represent a preference level of a video viewing user for the target video; obtains, in response to a user operation for selecting target template description information from the candidate template description information set, a target video editing template that matches the target template description information, and presents the target video editing template. By adopting the above technical solution, the first heat may characterize creation heat of the candidate video editing template at the video creation end, and the second heat can characterize viewing heat of the target video created using the candidate video editing template at the video publishing end. In this way, the heat of the candidate video editing template can be determined based on the heat of the entire link including the video creation end and the video publishing end, thereby expanding consideration factors for the heat of the candidate video editing template. Therefore, the heat of the candidate video editing template can be calculated more accurately, which further improves the accuracy of the candidate template description information set obtained based on the heat screening. Finally, the target video editing template can be more accurately determined based on the candidate template description information set, and the target video editing template can be presented at the video creation end for users to use for video creation and publishing. Therefore, this method can be applied to a mode for pushing a video template in a creation-oriented content ecological scenario, and the reliability of the mode for pushing a video template is ensured at the same time.

In some alternative embodiments, the first heat is determined based on first usage heat, second usage heat, and first interaction heat, the first usage heat is configured to represent a preference level of the video creation user for using at least part of material on the candidate video editing template for video creation, and the second usage heat is configured to represent a preference level of the video creation user for using the candidate video editing template for video creation; and the first interaction heat is configured to represent a preference level of the video creation user for performing an interaction operation on the candidate video editing template.

In some alternative embodiments, the second heat is determined based on first viewing heat, second viewing heat, and second interaction heat, the first viewing heat is configured to represent a preference level of the video viewing user for viewing an associated video including at least part of material in the target video, and the second viewing heat is configured to represent a preference level of the video viewing user for viewing the target video; and the second interaction heat is configured to represent a preference of the video viewing user for performing an interaction operation on the target video.

In some alternative embodiments, the heat of the candidate video editing template further includes:

search heat configured to represent a preference level of the video creation user for searching for the candidate video editing template;

and/or, recommendation heat configured to represent a preference level for recommending the candidate video editing template to the video creation user;

and/or, click heat configured to represent a preference level of the video creation user for clicking on the candidate video editing template.

In some alternative embodiments, the apparatus further includes:

an information obtaining module configured to obtain and present an updated set of candidate template description information, wherein the updated candidate template description information set includes updated candidate template description information, and the updated candidate template description information is screened into the updated candidate template description information set based on updated heat of the at least one candidate video editing template.

The apparatus for pushing a video template provided in the present disclosure may perform the method for pushing the video template provided in any embodiment of the present disclosure, the apparatus has the corresponding functional modules for performing the corresponding method and beneficial effects.

Figure 11:
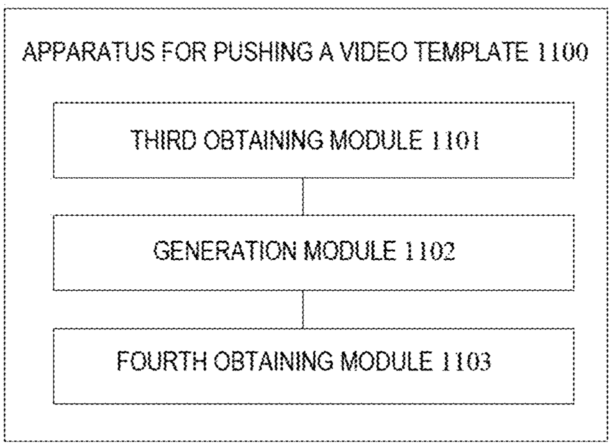
FIG. 11 is a structural schematic diagram of another apparatus for pushing a video template provided by an embodiment of the present disclosure.

FIG. 11 is a structural schematic diagram of another apparatus for pushing the video template provided in embodiments of the present disclosure. The device can be implemented by software and/or hardware and is configured in the server. As shown in FIG. 11, the apparatus for pushing the video template 1100 includes:

a third obtaining module 1101 configured to obtain heat of at least one candidate video editing template, where the candidate video editing template includes instruction information for a video editing operation, the candidate video editing template is configured to instruct to edit initial image material according to the video editing operation to obtain a target video, where the heat of the candidate video editing template includes first heat and second heat, the first heat is configured to represent a preference level of a video creation user for the candidate video editing template, and the second heat is configured to represent a preference level of a video viewing user for the target video;

a generation module 1102 configured to generate a candidate template description information set based on the heat of the at least one candidate video editing template, where the candidate template description information set includes at least one piece of candidate template description information, the candidate template description information is configured to describe a common feature of the at least one candidate video editing template, and push the candidate template description information set to a client to present the candidate template description information set.

a fourth obtaining module 1103 configured to receive target template description information selected from the candidate template description information set and sent by the client, obtain a target video editing template that matches the target template description information, and push the target video editing template to the client to present the target video editing template.

The apparatus for pushing a video template according to embodiments of the present disclosure obtains heat of at least one candidate video editing template, where the candidate video editing template includes instruction information for a video editing operation, the candidate video editing template is configured to instruct to edit initial image material according to the video editing operation to obtain a target video, where the heat of the candidate video editing template includes first heat and second heat, the first heat is configured to represent a preference level of a video creation user for the candidate video editing template, and the second heat is configured to represent a preference level of a video viewing user for the target video; generates a candidate template description information set based on the heat of the at least one candidate video editing template, where the candidate template description information set includes at least one piece of candidate template description information, the candidate template description information is configured to describe a common feature of the at least one candidate video editing template, and pushes the candidate template description information set to a client to present the candidate template description information set; and receives target template description information selected from the candidate template description information set and sent by the client, obtains a target video editing template that matches the target template description information, and pushes the target video editing template to the client to present the target video editing template. By adopting the above technical solution, the first heat may characterize creation heat of the candidate video editing template at the video creation end, and the second heat can characterize viewing heat of the target video created using the candidate video editing template at the video publishing end. In this way, the heat of the candidate video editing template can be determined based on the heat of the entire link including the video creation end and the video publishing end, thereby expanding consideration factors for the heat of the candidate video editing template. Therefore, the heat of the candidate video editing template can be calculated more accurately, which further improves the accuracy of the candidate template description information set obtained based on the heat screening. Finally, the target video editing template can be more accurately determined based on the candidate template description information set, and the target video editing template can be presented at the video creation end for users to use for video creation and publishing. Therefore, this method can be applied to a mode for pushing a video template in a creation-oriented content ecological scenario, and the reliability of the mode for pushing a video template is ensured at the same time.

In some alternative embodiments, the third obtaining module 1101 includes:

a first usage heat obtaining unit configured to obtain first usage heat of the video creation user for using at least part of material on the candidate video editing template for video creation;

a second use heat obtaining unit configured to obtain second use heat for video creation by the video creation user using the candidate video editing template;

a first interaction heat obtaining unit configured to obtain first interaction heat of the video creation user for performing an interaction operation on the candidate video editing template; and a first heat determining unit configured to determine the first heat based on the first usage heat, the second usage heat and the first interaction heat.

In some alternative embodiments, the third obtaining module 1101 includes:

a first viewing heat obtaining unit configured to obtain first viewing heat of the video viewing user for viewing an associated video including at least part of material in the target video;

a second viewing heat obtaining unit configured to obtain second viewing heat of the video viewing user for viewing the target video;

a second interaction heat obtaining unit configured to obtain second viewing heat of the video viewing user for viewing the target video; and a second heat determining unit configured to determine the second heat based on the first viewing heat, the second viewing heat, and the second interaction heat.

In some alternative embodiments, the apparatus further includes:

a search heat determining module configured to determine search heat based on search information of the video creation user for the candidate video editing template; and/or, a recommendation heat determining module configured to determine recommendation heat based on recommendation information regarding recommending the candidate video editing template to the video creation user; and/or, a click heat determining module configured to determine click heat based on an amount of clicks of the video creation user on the candidate video editing template.

In some alternative embodiments, the apparatus further includes:

a calculation module configured to calculate a similarity between a plurality of pieces of candidate template description information, and compare the similarity with a predetermined similarity threshold;

a merge processing module configured to merge, if the similarity is greater than the predetermined similarity threshold, the plurality of pieces of candidate template description information, and take candidate template description information corresponding to a candidate video editing template with a maximum heat value as the merged candidate template description information, based on heat of at least one candidate video editing template corresponding to each piece of the candidate template description information.

In some alternative embodiments, the calculation module includes:

a first calculation unit configured to calculate a template similarity between candidate video editing templates corresponding to individual pieces of the candidate template description information;

a second calculation unit configured to calculate a semantic similarity between individual pieces of the candidate template description information;

a third calculation unit configured to calculate a word similarity between triggering words corresponding to individual pieces of candidate template description information; and a fourth calculation unit configured to calculate the similarity between the plurality of pieces of candidate template description information based on the template similarity, the semantic similarity, and the word similarity.

In some alternative embodiments, the apparatus further includes:

a recall module configured to recall a plurality of recall video editing templates corresponding to recall reporting description information; and a deduplication processing module configured to perform deduplication on the plurality of candidate video editing templates and the plurality of recall video editing templates to obtain deduplicated templates.

In some alternative embodiments, the recall module includes:

a subject type determining unit configured to determine a topic type of the recall reporting description information;

a template recall mode determining unit configured to determine a corresponding template recall mode based on the topic type of the recall reporting description information;

a recall unit configured to recall the plurality of recall video editing templates from a preset template library based on the template recall mode.

In some alternative embodiments, the deduplication processing module includes:

a first extraction unit configured to extract material information from each of the candidate video editing templates and each of the recall video editing templates, and obtain, based on the material information, content features respectively corresponding to each of the candidate video editing templates and each of the recall video editing templates;

a first similarity calculation unit configured to determine, based on the content features, first similarities between each two templates of the plurality of candidate video editing templates and the plurality of recall video editing templates;

a second extraction unit configured to extract segment information from each of the candidate video editing templates and each of the recall video editing templates, and obtain based on the segment information, structural features respectively corresponding to each of the candidate video editing templates and each of the recall video editing templates;

a second similarity calculation unit configured to determine, based on the structural features, second similarities between each two templates of the plurality of candidate video editing templates and the plurality of recall video editing templates; and

- a deduplication processing unit configured to perform deduplication on the plurality of candidate video editing templates and the plurality of recall video editing templates based on the first similarities and the second similarities.

In some alternative embodiments, the apparatus further includes:

- a consumption posterior index obtaining module configured to obtain a consumption posterior index indicating usage of the video viewing user for the candidate video editing template that matches the candidate template description information during an observation window period; and
- a set updating module configured to adjust the heat of the candidate video editing template based on the consumption posterior index, and update the candidate template description information set based on the adjusted heat.

The apparatus for pushing a video template provided in the present disclosure may perform the method for pushing a video template provided in any embodiment of the present disclosure, the apparatus has the corresponding functional modules for performing the corresponding method and beneficial effects.

To achieve the above embodiments, the present disclosure also provides a computer program product including a computer program or instructions, the computer program/instructions, when executed on a client, cause the client to implement the method for pushing the video template when executed by a processor.

Figure 12:
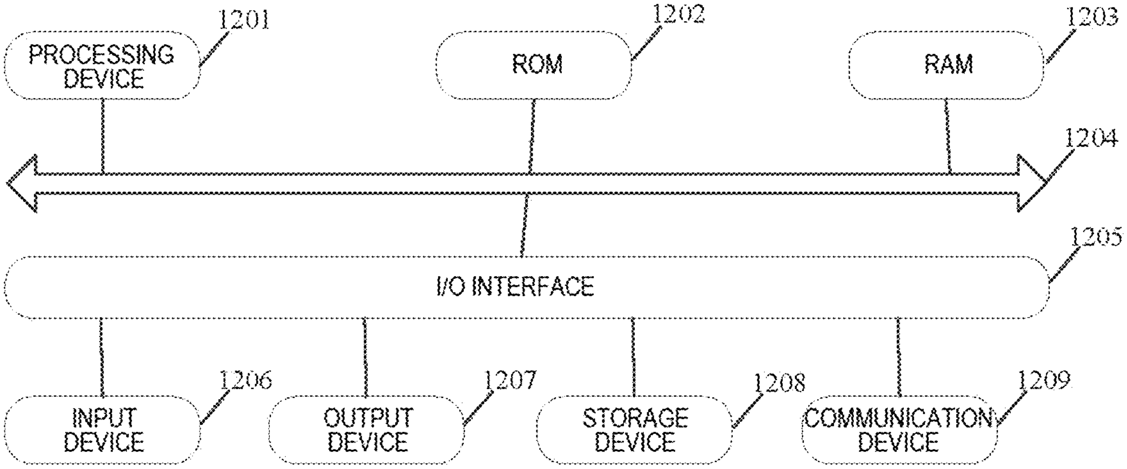
FIG. 12 is a structural schematic diagram of a client provided by an embodiment of the present disclosure.

FIG. 12 is a structural schematic diagram of a client provided by an embodiment of the present disclosure.

FIG. 12 below shows a structural schematic diagram of a client suitable for implementing embodiments of the present disclosure. The client in the embodiment of the present disclosure may include but is not limited to mobile terminals such as mobile phones, laptops, digital broadcast receivers, PDAs (Personal Digital Assistants), PADs (tablet computers), PMPs (portable multimedia players), car-mounted terminals (such as car navigation terminals), etc. and fixed terminals such as digital televisions (TV), desktop computers, etc. The client shown in FIG. 12 is only an example and should not bring any limitation on the functionality and scope of use of the embodiment of the present disclosure.

As shown in FIG. 12, the client may include a processing device (such as a central processing unit, graphics processing unit, etc.) 1201, which may perform various appropriate actions and processes based on programs stored in Read-Only Memory (ROM) 1202 or loaded from storage device 1208 into Random Access Memory (RAM) 1203. In the RAM 1203, various programs and data necessary for the operation of the client are also stored. The processing device 1201, ROM 1202, and RAM 1203 are connected to each other through a bus 1204. An Input/Output I/O interface 1205 is also connected to the bus 1204.

Typically, the following devices can be connected to I/O interface 1205: input device 1206 including, for example, touch screens, touchpads, keyboards, mice, cameras, microphones, accelerometers, gyroscopes, etc.; output device 1207 including liquid crystal displays (LCDs), speakers, vibrators, etc.; storage device 1208 including magnetic tapes, hard disks, etc.; and a communication device 1209. The communication device 1209 may allow the client to communicate with other devices wirelessly or wirelessly to exchange data. Although FIG. 12 shows a client with a plurality of devices, it shall be understood that it is not required to implement or have all of the devices shown. More or fewer devices can be implemented or provided instead.

In particular, according to embodiments of the present disclosure, the process described by the above flowchart can be implemented as a computer software program. For example, an embodiment of the present disclosure includes a computer program product that includes a computer program carried on a non-transitory computer-readable medium, where the computer program includes program code for performing the method shown in the flowchart. In such an embodiment, the computer program can be downloaded and installed from a network through the communication device 1209, or installed from the storage device 1208, or installed from the ROM 1202. When the computer program is executed by the processing device 1201, the above functions defined in the method for pushing a video template of the embodiment of the present disclosure are performed.

It should be noted that the computer-readable medium described above can be a computer-readable signal medium or a computer-readable storage medium, or any combination thereof. The computer-readable storage medium can be, for example, but not limited to, an electrical, magnetic, optical, electromagnetic, infrared, or semiconductor system, apparatus, or device, or any combination thereof. Specific examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, a computer-readable storage medium may be any tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, including but not limited to electromagnetic signals, optical signals, or any suitable combination thereof. A computer-readable signal medium may also be any computer-readable medium other than a computer-readable storage medium, which can send, propagate, or transmit programs for use by or in conjunction with instruction execution systems, apparatus, or devices. The program code contained on the computer-readable medium may be transmitted using any suitable medium, including but not limited to: wires, optical cables, RF (radio frequency), etc., or any suitable combination thereof.

In some embodiments, clients and servers can communicate using any currently known or future developed network protocol such as HTTP (HyperText Transfer Protocol), and can be interconnected with any form or medium of digital data communication (such as communication networks). Examples of communication networks include local area networks ("LANs"), wide area networks ("WANs"), internetworks (such as the Internet), and end-to-end networks (such as ad hoc end-to-end networks), as well as any currently known or future developed networks.

The computer-readable medium can be included in the client, or it can exist alone without being assembled into the client.

The above-mentioned computer-readable medium carries one or more programs, and when the above-mentioned one or more programs are executed by the client, so that the client perform the method for pushing a video template.

Computer program codes for performing the operations of the present disclosure may be written in one or more programming languages or a combination thereof, including but not limited to Object Oriented programming languages—such as Java, Smalltalk, C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure may be implemented by means of software or hardware, and the name of the unit does not constitute a limitation on the unit itself in a certain case.

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include, but are not limited to, electronic, magnetic, optical, electromagnetic, infrared, or semiconductor systems, apparatuses, or devices, or any suitable combination thereof. Specific examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or any suitable combination thereof.

The above description is only embodiments of this disclosure and an explanation of the technical principles used. Those skilled in the art should understand that the scope of the disclosure involved in this disclosure is not limited to technical solutions composed of specific combinations of the above technical features, but should also covers other technical solutions formed by arbitrary combinations of the above technical features or their equivalent features without departing from the above disclosure concept. For example, technical solutions formed by replacing the above features with (but not limited to) technical features with similar functions disclosed in this disclosure.

In addition, although a plurality of operations are depicted in a specific order, this should not be understood as requiring these operations to be performed in the specific order shown or in a sequential order. In certain environments, multitasking and parallel processing may be advantageous. Similarly, although a plurality of implementation details are included in the above discussion, these should not be construed as limiting the scope of the present disclosure. Some features described in the context of individual embodiments can also be implemented in combination in a single embodiment. Conversely, a plurality of features described in the context of a single embodiment can also be implemented in a plurality of embodiments separately or in any suitable sub-combination.

Although the subject matter has been described in language specific to structural features and/or methodological logical actions, it should be understood that the subject matter defined in the appended claims is not necessarily limited to the specific features or actions described above. On the contrary, the specific features and actions described above are merely example forms of implementing the claims.

We claim:

1. A method for pushing a video template, wherein the method is applied to a client, and the method comprises:

obtaining, by the client, a candidate template description information set, wherein the candidate template description information set comprises at least one piece of candidate template description information, the at least one piece of candidate template description information describing a common feature of at least one candidate video editing template, wherein the candidate template description information is screened based on a heat of the at least one candidate video editing template, and wherein the candidate template description information is added to the candidate template description information set based on the screening;

presenting, to a video creation user, the candidate template description information set, comprising the at least one piece of candidate template description information that is associated with the candidate video editing template, wherein the candidate video editing template comprises an instruction for performing a video editing operation, the candidate video editing template configured to instruct the video creation user to edit initial image material via the video editing operation to obtain a video, wherein the heat comprises first heat and second heat, the first heat representing a preference level of a video creation user for the candidate video editing template, the second heat representing a preference level of a video viewing user for the video;

in response to a user operation for selecting template description information from the candidate template description information set, obtaining a corresponding video editing template that matches the selected template description information; and presenting, to the video creation user, the corresponding video editing template.

2. The method according to claim 1, wherein the first heat is determined based on first usage heat, second usage heat, and first interaction heat, wherein, the first usage heat is configured to represent a preference level of the video creation user for using at least part of material on the candidate video editing template for video creation, and the second usage heat is configured to represent a preference level of the video creation user for using the candidate video editing template for video creation; and the first interaction heat is configured to represent a preference level of the video creation user for performing an interaction operation on the candidate video editing template.

3. The method according to claim 1, wherein the second heat is determined based on first viewing heat, second viewing heat, and second interaction heat, wherein, the first viewing heat is configured to represent a preference level of the video viewing user for viewing an associated video comprising at least part of material in the video, and the second viewing heat is configured to represent a preference level of the video viewing user for viewing the video; and the second interaction heat is configured to represent a preference of the video viewing user for performing an interaction operation on the video.

4. The method according to claim 1, wherein the heat of the candidate video editing template further comprises:

search heat configured to represent a preference level of the video creation user for searching for the candidate video editing template;

and/or, recommendation heat configured to represent a preference level for recommending the candidate video editing template to the video creation user;

and/or, click heat configured to represent a preference level of the video creation user for clicking on the candidate video editing template.

5. The method according to claim 1, further comprising:

obtaining and presenting an updated candidate template description information set, wherein the updated candidate template description information set comprises updated candidate template description information, and the updated candidate template description information is screened into the updated candidate template description information set based on updated heat of the at least one candidate video editing template.

6. A method for pushing a video template, wherein the method is applied to a server, the method comprising:

obtaining a heat of at least one candidate video editing template, wherein the candidate video editing template comprises instruction information for performing a video editing operation, the candidate video editing template configured to instruct a video creation user to edit initial image material via the the video editing operation to obtain a video, wherein the heat comprises first heat and second heat, the first heat representing a preference level of the video creation user for the candidate video editing template, the second heat representing a preference level of a video viewing user for the video;

generating, by the server, a candidate template description information set based on the heat, wherein the candidate template description information set comprises at least one piece of candidate template description information, the at least one piece of candidate template description information describing a common feature of the at least one candidate video editing template;

pushing the candidate template description information set to a client, wherein the client is configured to present the candidate template description information set to the video creation user;

receiving template description information selected from the candidate template description information set;

obtaining a corresponding video editing template matching the selected template description information; and pushing the corresponding video editing template to the client, wherein the client is configured to present the corresponding video editing template to the video creation user.

7. The method according to claim 6, wherein obtaining the first heat in the heat of the candidate video editing template comprises:

obtaining first usage heat of the video creation user for using at least part of material on the candidate video editing template for video creation;

obtaining second usage heat of the video creation user for using the candidate video editing template for video creation;

obtaining first interaction heat of the video creation user for performing an interaction operation on the candidate video editing template; and determining the first heat based on the first usage heat, the second usage heat and the first interaction heat.

8. The method according to claim 6, wherein obtaining the second heat in the heat of the candidate video editing template comprises:

obtaining first viewing heat of the video viewing user for viewing an associated video comprising at least part of material in the video;

obtaining second viewing heat of the video viewing user for viewing the video;

obtaining second interaction heat of the video viewing user for performing an interaction operation on the video; and determining the second heat based on the first viewing heat, the second viewing heat, and the second interaction heat.

9. The method according to claim 6, wherein obtaining the heat of the candidate video editing template further comprises:

determining search heat based on search information of the video creation user for the candidate video editing template;

and/or, determining recommendation heat based on recommendation information regarding recommending the candidate video editing template to the video creation user;

and/or, determining click heat based on an amount of clicks of the video creation user on the candidate video editing template.

10. The method according to claim 6, further comprising:

calculating a similarity between a plurality of pieces of candidate template description information, and comparing the similarity with a predetermined similarity threshold; and if the similarity is greater than the predetermined similarity threshold, merging the plurality of pieces of candidate template description information, and taking candidate template description information corresponding to a candidate video editing template with a maximum heat value as the merged candidate template description information, based on heat of at least one candidate video editing template corresponding to each piece of the candidate template description information.

11. The method according to claim 10, wherein calculating the similarity between the plurality of pieces of candidate template description information comprises:

calculating a template similarity between candidate video editing templates corresponding to individual pieces of the candidate template description information;

calculating a semantic similarity between individual pieces of the candidate template description information;

calculating a word similarity between triggering words corresponding to individual pieces of candidate template description information; and calculating the similarity between the plurality of pieces of candidate template description information based on the template similarity, the semantic similarity, and the word similarity.

12. The method according to claim 6, further comprising:

obtaining a plurality of recall video editing templates corresponding to recall reporting description information; and performing deduplication on the plurality of candidate video editing templates and the plurality of recall video editing templates to obtain deduplicated templates.

13. The method according to claim 12, wherein obtaining the plurality of recall video editing templates corresponding to the recall reporting description information comprises:

determining a topic type of the recall reporting description information;

determining a corresponding template recall mode based on the topic type of the recall reporting description information; and recalling the plurality of recall video editing templates from a preset template library based on the template recall mode.

14. The method according to claim 12, wherein performing deduplication on the plurality of candidate video editing templates and the plurality of recall video editing templates comprises:

extracting material information from each of the candidate video editing templates and each of the recall video editing templates, and obtaining, based on the material information, content features respectively corresponding to each of the candidate video editing templates and each of the recall video editing templates;

determining, based on the content features, first similarities between each two templates of the plurality of candidate video editing templates and the plurality of recall video editing templates;

extracting segment information from each of the candidate video editing templates and each of the recall video editing templates, and obtaining, based on the segment information, structural features respectively corresponding to each of the candidate video editing templates and each of the recall video editing templates;

determining, based on the structural features, second similarities between each two templates of the plurality of candidate video editing templates and the plurality of recall video editing templates; and performing deduplication on the plurality of candidate video editing templates and the plurality of recall video editing templates based on the first similarities and the second similarities.

15. The method according to claim 6, wherein the method further comprises:

after pushing the candidate template description information set to the client to present the candidate template description information set, obtaining a consumption posterior index indicating usage of the video viewing user for the candidate video editing template that matches the candidate template description information during an observation window period; and adjusting the heat of the candidate video editing template based on the consumption posterior index, and updating the candidate template description information set based on the adjusted heat.

16. A device comprising: a memory, a processor and a computer program stored in the memory and executable on the processor, the processor, when executing the computer program, performs acts comprising:

obtaining, by the client, a candidate template description information set, wherein the candidate template description information set comprises at least one piece of candidate template description information, the at least one piece of candidate template description information describing a common feature of at least one candidate video editing template, wherein the candidate template description information is screened based on a heat of the at least one candidate video editing template, and wherein the candidate template description information is added to the candidate template description information set based on the screening;

presenting, to a video creation user, the candidate template description information set, comprising the at least one piece of candidate template description information that is associated with the candidate video editing template, wherein the candidate video editing template comprises an instruction for performing a video editing operation, the candidate video editing template configured to instruct the video creation user to edit initial image material via the video editing operation to obtain a video, wherein the heat comprises first heat and second heat, the first heat representing a preference level of a video creation user for the candidate video editing template, the second heat representing a preference level of a video viewing user for the video;

in response to a user operation for selecting template description information from the candidate template description information set, obtaining a corresponding video editing template that matches the selected template description information; and presenting, to the video creation user, the corresponding video editing template.

17. The device according to claim 16, wherein the first heat is determined based on first usage heat, second usage heat, and first interaction heat, wherein, the first usage heat is configured to represent a preference level of the video creation user for using at least part of material on the candidate video editing template for video creation, and the second usage heat is configured to represent a preference level of the video creation user for using the candidate video editing template for video creation; and the first interaction heat is configured to represent a preference level of the video creation user for performing an interaction operation on the candidate video editing template.

18. The device according to claim 16, wherein the second heat is determined based on first viewing heat, second viewing heat, and second interaction heat, wherein, the first viewing heat is configured to represent a preference level of the video viewing user for viewing an associated video comprising at least part of material in the video, and the second viewing heat is configured to represent a preference level of the video viewing user for viewing the video; and the second interaction heat is configured to represent a preference of the video viewing user for performing an interaction operation on the video.

19. The device according to claim 16, wherein the heat of the candidate video editing template further comprises:

search heat configured to represent a preference level of the video creation user for searching for the candidate video editing template;

and/or, recommendation heat configured to represent a preference level for recommending the candidate video editing template to the video creation user;

and/or, click heat configured to represent a preference level of the video creation user for clicking on the candidate video editing template.

20. The device according to claim 16, wherein the acts further comprise:

obtaining and presenting an updated candidate template description information set, wherein the updated candidate template description information set comprises updated candidate template description information, and the updated candidate template description information is screened into the updated candidate template description information set based on updated heat of the at least one candidate video editing template.

* * * * *